United States Patent
Narsimhan et al.

(10) Patent No.: US 11,591,413 B2
(45) Date of Patent: Feb. 28, 2023

(54) SWELLING OF STARCH SUSPENSIONS

(71) Applicant: Purdue Research Foundation, West Lafayette, IN (US)

(72) Inventors: Ganesan Narsimhan, West Lafayette, IN (US); Gnana Prasuna Desam, West Lafayette, IN (US); Jinsha Li, Decatur, IL (US); Vivek Narsimhan, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 493 days.

(21) Appl. No.: 16/795,205

(22) Filed: Feb. 19, 2020

(65) Prior Publication Data
US 2020/0262935 A1 Aug. 20, 2020

Related U.S. Application Data

(60) Provisional application No. 62/808,226, filed on Feb. 20, 2019.

(51) Int. Cl.
*C08B 30/08* (2006.01)
*A23L 29/212* (2016.01)
*C08B 30/04* (2006.01)

(52) U.S. Cl.
CPC ............ *C08B 30/08* (2013.01); *A23L 29/212* (2016.08); *C08B 30/044* (2013.01)

(58) Field of Classification Search
None
See application file for complete search history.

(56) References Cited

U.S. PATENT DOCUMENTS

2006/0225731 A1* 10/2006 Woortman ........... A23C 9/1544
127/71

OTHER PUBLICATIONS

Ai, Y. and J.-I. Jane (2015). "Gelatinization and rheological properties of starch." Starch—Stärke 67(3-4): 213-224.
Bagley, E. B. and D. D. Christianson (1982). "Swelling Capacity of Starch and Its Relationship to Suspension Viscosity-Effect of Cooking Time, Temperature and Concentration." Journal of Texture Studies 13(1): 115-126.
Baker, A., M. Miles and W. Helbert (2001). "Internal structure of the starch granule revealed by AFM." Carbohydrate Research 330(2): 249-256.
Baumgartner, S., J. Kristi and N. Peppas (2002). "Network structure of cellulose ethers used in pharmaceutical applications during swelling and at equilibrium." Pharmaceutical Research 19(8): 1084-1090.
Biliaderis, C. G. (1991). "The Structure and Interactions of Starch with Food Constituents." Canadian Journal of Physiology and Pharmacology 69(1): 60-78.

(Continued)

*Primary Examiner* — Stefanie J Cohen
(74) *Attorney, Agent, or Firm* — Brannon Sowers & Cracraft PC

(57) ABSTRACT

A methodology useful for predicting the texture of a heated starch suspension by predicting the storage modulus (G') of the starch suspension resulting from starch granule swelling during heating has been developed. The methodology is based on the physical properties of the starch granules in the starch suspension and the temperature history of the heated starch suspension.

19 Claims, 38 Drawing Sheets

(56) References Cited

OTHER PUBLICATIONS

Delgado, J. (2006). "A simple experimental technique to measure tortuosity in packed beds." Canadian Journal of Chemical Engineering 84(6): 651-655.

Desam, G. P., J. Li, G. Chen, O. Campanella and G. Narsimhan (2019). "Swelling kinetics of rice and potato starch suspensions" Journal of Food Process Engineering n/a(n/a): e13353.

Desam, G. P., J. S. Li, G. B. Chen, O. Campanella and G. Narsimhan (2018a). "A mechanistic model for swelling kinetics of waxy maize starch suspension." Journal of Food Engineering 222: 237-249.

Desam, G. P., J. S. Li, G. B. Chen, O. Campanella and G. Narsimhan (2018b). "Prediction of swelling behavior of crosslinked maize starch suspensions." Carbohydrate Polymers 199: 331-340.

Desmond, K. W. and E. R. Weeks (2014). "Influence of particle size distribution on random close packing of spheres." Physical Review E 90(2): 022204.

Doublier, J. L. (1981). "Rheological Studies on Starch—Flow Behavior of Wheat-Starch Pastes." Starke 33(12): 415-420.

Ellis, H. S., S. G. Ring and M. A. Whittam (1989). "A comparison of the viscous behavior of wheat and maize starch pastes. ." Journal of Cereal Science 10 33-44.

Evans, I. D. and D. R. Haisman (1980). "Rheology of gelatinized starch suspensions" Journal of Texture Studies 10 (4): 347-370.

Evans, I. D. and A. Lips (1992). "Viscoelasticity of Gelatinized Starch Dispersions." Journal of Texture Studies 23(1): 69-86.

Frith, W. J., J. Mewis and T. A. Strivens (1987). "Rheology of concentrated suspensions: experimental investigations." Powder Technology 51(1): 27-34.

Hirotsu, S., Y. Hirokawa and T. Tanaka (1987). "Volume-phase transitions of ionized N-isopropylacrylamide gels." J. Chem. Phys. 87(2): 1392-1395.

Hooper, H. H., J. P. Baker, H. W. Blanch and J. M. Prausnitz (1990). "Swelling equilibria for positively charged polyacrylamide hydrogels." Macromolecules 23(4): 1096-1104.

Hoover, R. (2001). "Composition, molecular structure, and physicochemical properties of tuber and root starches: a review." Carbohydrate Polymers 45(3): 253-267.

Hoover, R. and D. Hadziyev (1981). "Characterization of Potato Starch and Its Monoglyceride Complexes." Starke 33 (9): 290-300.

Huang, J. R., H. A. Schols, J. J. G. van Soest, Z. Y. Jin, E. Sulmann and A. G. J. Voragen (2007). "Physicochemical properties and amylopectin chain profiles of cowpea, chickpea and yellow pea starches." Food Chemistry 101(4): 1338-1345.

Jackson, P. D., D. Taylorsmith and P. N. Stanford (1978). "Resistivity-porosity-particle shape relationships for marine sands." Geophysics 43(6): 1250-1268.

Jobling, S. (2004). "Improving starch for food and industrial applications." Current Opinion in Plant Biology 7(2): 210-218.

Johnson, K. L., K. Kendall and A. D. Roberts (1971). "Surface energy and the contact of elastic solids." Proceedings Royal Society of London A 324: 301-313.

Keetels, C. J. A. M. and T. Van Vliet (1994). Gelation and retrogradation of concentrated starch gels. Gums and Stabilizers for the Food Industry. G. O. Pillips, P. A. Williams and D. J. Wedlock. New York, IRL.

Kim, B., K. La Flamme and N. A. Peppas (2003). "Dynamic swelling Behavior of pH-sensitive anionic hydrogels used for protein delivery." Journal of Applied Polymer Science 89(6): 1606-1613.

Kruger, A., C. Ferrero and N. E. Zaritzky (2003). "Modelling corn starch swelling in batch systems: effect of sucrose and hydrocolloids." Journal of Food Engineering 58(2): 125-133.

Lagarrigue, S., G. Alvarez, G. Cuvelier and D. Flick (2008). "Swelling kinetics of waxy maize and maize starches at high temperatures and heating rates." Carbohydrate Polymers 73(1): 148-155.

Lan, H., R. Hoover, L. Jayakody, Q. Liu, E. Donner, M. Baga, E. K. Asare, P. Hucl and R. N. Chibbar (2008). "Impact of annealing on the molecular structure and physicochemical properties of normal, waxy and high amylose bread wheat starches." Food Chemistry 111(3): 663-675.

Mason, T. G. and D. A. Weitz (1995). "Linear Viscoelasticity of Colloidal Hard Sphere Suspensions near the Glass Transition." Physical Review Letters 75(14): 2770-2773.

Matyka, M., A. Khalili and Z. Koza (2008). "Tortuosity-porosity relation in porous media flow." Physical Review E 78(2).

Mishra, S. and T. Rai (2006). "Morphology and functional properties of corn, potato and tapioca starches." Food Hydrocolloids 20(5): 557-566.

Narsimhan, G. and E. Ruckenstein (1986a). "Hydrodynamics, Enrichment, and Collapse in Foams." Langmuir 2(2): 230-238.

Navickis, L. L. and E. B. Bagley (1983). "Yield Stresses in Concentrated Dispersions of Closely Packed, Deformable Gel Particles." Journal of Rheology 27(6): 519-536.

Obanni, M. and J. N. Bemiller (1997). "Properties of some starch blends." Cereal Chemistry 74(4): 431-436.

Ofner, C. and W. Bubnis (1996). "Chemical and swelling evaluations of amino group crosslinking in gelatin and modified gelatin matrices." Pharmaceutical Research 13(12): 1821-1827.

Okechukwu, P. E. and M. A. Rao (1995). "Influence of granule size on viscosity of cornstarch suspension." Journal of Texture Studies 26(5): 501-516.

Okechukwu, P. E. and M. A. Rao (1996). "Role of granule size and size distribution in the viscosity of cowpea starch dispersions heated in excess water." Journal of Texture Studies 27(2): 159-173.

Owens, D. K. and R. C. Wendt (1969). "Estimation of Surface Free Energy of Polymers." Journal of Applied Polymer Science 13(8): 1741.

Prince, L. M. (1967). "A theory of aqueous emulsions I. Negative interfacial tension at the oil/water interface." Journal of Colloid And Interface Science 23(2): 165-173.

Rieka, J. and T. Tanaka (1985). "Phase transition in ionic gels induced by copper complexation." Macromolecules 18(1): 83-85.

Shen, L. and Z. Chen (2007). "Critical review of the impact of tortuosity on diffusion." Chemical Engineering Science 62(14): 3748-3755.

Singh, J., A. Dartois and L. Kaur (2010). "Starch digestibility in food matrix: a review." Trends in Food Science & Technology 21(4): 168-180.

Singh, J., L. Kaur and O. J. McCarthy (2007). "Factors influencing the physico-chemical, morphological, thermal and rheological properties of some chemically modified starches for food applications—A review." Food Hydrocolloids 21(1): 1-22.

Singh, J. and N. Singh (2001). "Studies on the morphological, thermal and rheological properties of starch separated from some Indian potato cultivars." Food Chemistry 75(1): 67-77.

Singh, N. and L. Kaur (2004). "Morphological, thermal, rheological and retrogradation properties of potato starch fractions varying in granule size." Journal of the Science of Food and Agriculture 84(10): 1241-1252.

Singh, N., J. Singh, L. Kaur, N. S. Sodhi and B. S. Gill (2003). "Morphological, thermal and rheological properties of starches from different botanical sources." Food Chemistry 81(2): 219-231.

Stamenovic, D. (1991). "A Model of Foam Elasticity Based Upon the Laws of Plateau." Journal of Colloid and Interface Science 145(1): 255-259.

Tan, I., P. J. Torley and P. J. Halley (2008). "Combined rheological and optical investigation of maize, barley and wheat starch gelatinisation." Carbohydrate Polymers 72(2): 272-286.

Tanaka, T. (1978). "Collapse of gels and critical endpoint." Phys. Rev. Lett. 40(12): 820-823.

Tester, R. F. and W. R. Morrison (1990a). "Swelling and Gelatinization of Cereal Starches .1. Effects of Amylopectin, Amylose, and Lipids." Cereal Chemistry 67(6): 551-557.

Tester, R. F. and W. R. Morrison (1990a). "Swelling and gelatinization of cereal starches. I. Effects of amylopectin, amylose, and lipids. ." Cereal Chem 67: 551-557.

Tester, R. F. and W. R. Morrison (1990b). "Swelling and gelatinization of cereal starches. II. Waxy rice starches." Cereal Chem 67(6): 558-563.

(56) References Cited

OTHER PUBLICATIONS

Thorat, I., D. Stephenson, N. Zacharias, K. Zaghib, J. Harb and D. Wheeler (2009). "Quantifying tortuosity in porous Li-ion battery materials." Journal of Power Sources 188(2): 592-600.

Tsai, M.-L., C.-F. Li and C.-Y. Lii (1997). "Effects of Granular Structures on the Pasting Behaviors of Starches." Cereal Chemistry 74(6): 750-757.

Vargaftik, N. B., B. N. Volkov and L. D. Voljak (1983). "International Tables of the Surface Tension of Water." Journal of Physical and Chemical Reference Data 12(3): 817-820.

Yadav, R. B., N. Kumar and B. S. Yadav (2016). "Characterization of banana, potato, and rice starch blends for their physicochemical and pasting properties." Cogent Food & Agriculture 2(1): 1127873.

Yeh, A. I. and S. L. Yeh (1993). "Some characteristics of hydroxypropylated and cross-linked rice starch." Cereal Chemistry 70(5): 596-601.

Zhang, J. and N. A. Peppas (2000). "Synthesis and characterization of pH- and temperature-sensitive poly(methacrylic acid)/poly(N-isopropylacrylamide) interpenetrating polymeric networks." Macromolecules 33(1): 102-107.

Zhang, S., X. Fan, L. Lin, L. Zhao, A. Liu and C. Wei (2016). "Properties of Starch from Root Tuber of Stephania epigaea in Comparison with Potato and Maize Starches." International Journal of Food Properties: 1-11.

\* cited by examiner a b

SWELLING OF STARCH SUSPENSIONS

CROSS-REFERENCE TO RELATED APPLICATIONS

The present U.S. patent application claims the benefit under 35 U.S.C. § 119(e) of U.S. Provisional Patent Application No. 62/808,226, filed Feb. 20, 2019, the contents of which are hereby incorporated by reference in their entirety into the present disclosure.

GOVERNMENT RIGHTS

This invention was made with government support under grant 2015-67017-23073, awarded by the United States Department of Agriculture's National Institute of Food and Agriculture. The U.S. government has certain rights in the invention.

SUMMARY OF THE INVENTION

Starches are incorporated in product formulations for a variety of reasons such as stabilizing, thickening, binding and gelling. Starch occurs as discrete granules. Upon exposure to water, starch granules swell when heated. This results in thickening of starch suspension (known as pasting) due to an increase in volume fraction of swollen granules. Starch pasting results in an increase in its viscoelasticity. Therefore, the texture of formulations containing starch suspensions is influenced by pasting. The rheology and texture of starch paste during heating are governed by the swelling of starch granules, and hence are sensitive to the starch type, formulation, and heating profile. This is of great interest for a variety of food products such as sauces, puddings, soups, batter mixes, etc.

In industry, the current state of the art in characterizing starch pasting is trial and error and therefore is not cost effective. Means to quantify swelling and relate it to texture in order to predict the rheology of starch paste as well as to develop new food formulations is desired.

Described herein is an analytic which can (i) predict swelling of starch suspensions given the heating profile for any type of starch and (ii) relate it to the texture (storage modulus). The input variables to the analytic are the physical properties of starch such as gelatinization temperature, enthalpy of gelatinization, starch-water interaction parameter, the extent of starch cross-linking, and interfacial energy between the starch granule and water. This analytic utilizes a master curve described herein to relate the volume fraction of swollen starch granules to normalized storage modulus and is surprisingly applicable to any starch type and formulation.

This analytic can be applied to simulate a process for any chosen heating profile and predict the development of texture for a starch-based product with a high moisture formulation. A manufacturer can use this procedure to evaluate different formulations (starch types) and processing conditions (heating profile) to obtain product of given texture. Eliminating or reducing the number of trials needed to arrive at an optimized heating profile (temperature vs time) for a starch based high moisture formulation to obtain a desired texture. This may allow the formulator to save time, money and material during product development.

DETAILED DESCRIPTION

Figure 1:
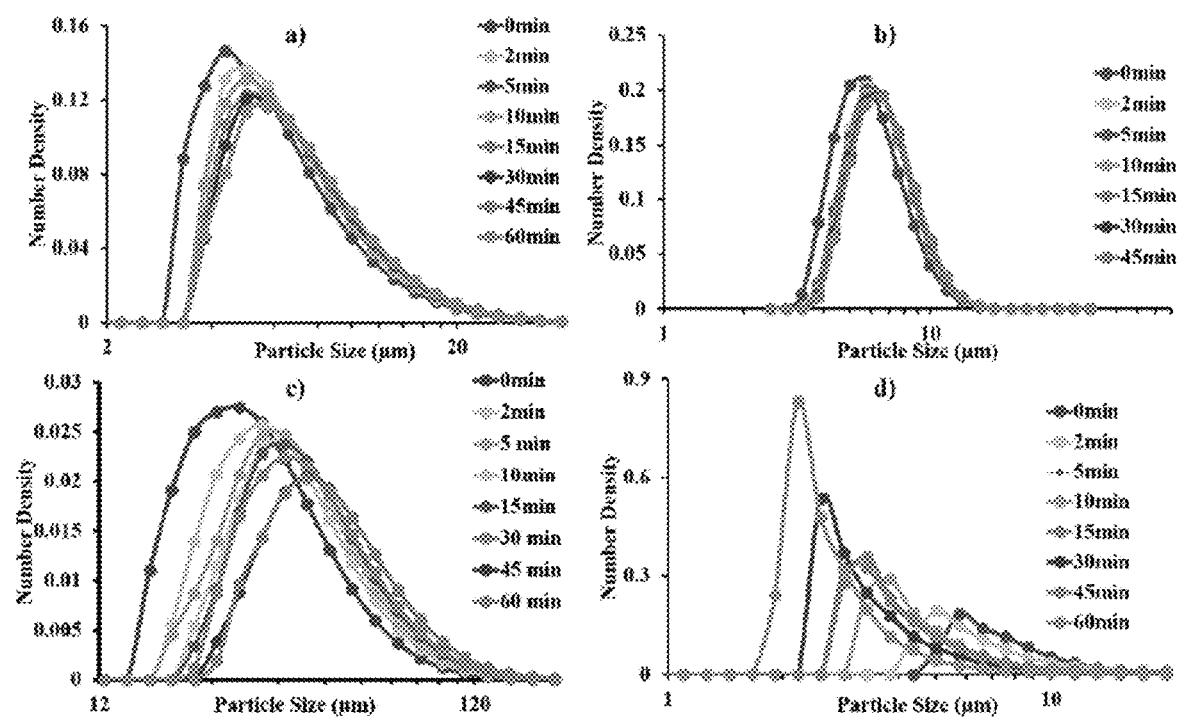
FIG. 1 Particle size distribution curve of a) WRS b) NRS c) Novation 1600 and c) Penpure 80 heated to 65° C. and holding for different times at 65° C.

Starch is an important storage product in plants acting as a main energy source in human diet. Starch can be obtained from various botanical sources and may differ in granular morphology, molecular weight, composition, and physiochemical properties. Commercial starches are commonly obtained from various plant sources such as wheat, maize, rice, potato, and banana. Depending on the source, starches have different properties resulting in varied applications in improving consistency, stability, and other properties of foods (Yadav, Kumar et al. 2016). Starches are attractive food ingredients for texture modification because they are natural and safe (Mishra and Rai 2006). Not only is the amount of starch important for the texture of a given product, but starch type is equally critical (Biliaderis 1991).

Starches with novel properties and functionalities have attracted the interest of researchers and industry for wide applications in food and other industries. Each starch has unique functional properties, but most of those used by industries are modified before use, giving a wide range of useful products. Chemical modification is widely used to attain desirable functional properties for a wide range of utilization; however, with the growing market demand for natural food, there is greater necessity to search for alternatives to chemical modification. One possibility may be the use of blends of different starches, although this is not a common practice not much work has been done in this area despite its high potential. Native starch blends are increasingly applied in food industry to make starchy foods with a desired rheological property, texture, or storage stability, or to replace modified starches (Obanni and Bemiller 1997). It is possible to formulate starch blends from unmodified starches that possess at least some of the desired characteristics of modified starches. Starch granules are insoluble in cold water, but on heating in water granules swell rapidly causing the amylose to leach out of the granules and thus increasing the viscosity of the solution (Jobling 2004). Swelling is affected by amylose/amylopectin ratio, as well as granule organisation (Hoover 2001, Singh, Dartois et al. 2010). Swelling of starch is characterized by an initial phase of slight swelling followed by rapid swelling and a final stage of approach to equilibrium swelling (Tester and Morrison 1990a, Lagarrigue, Alvarez et al. 2008). The swelling process varies depending on the size of the starch granules, amylose and amylopectin content, granule damage, and temperature.

Comparison of waxy and normal starches indicate that swelling power is a property of amylopectin and that amylose, lipids (Tester and Morrison 1990a) and gums (Kruger, Ferrero et al. 2003) inhibit swelling. Swelling power and water solubility gradually increased with increasing temperature after 60° C. for S. epigaea and potato starches and after 65° C. for maize starch (Zhang, Fan et al. 2016). Tuber starches swell more than cereal starches, and waxy cereal starches swell more than non-waxy starches (Huang, Schols et al. 2007). Tuber and root starches, such as potatoes, have very high swelling power because of the presence of phosphate groups (Jobling 2004). Waxy starch granules have a higher swelling power and absorb 10-20% more water than normal wheat starch (Lan, Hoover et al. 2008). Experimental measurements of evolution of granule size distribution of corn and cowpea starch due to swelling when heated to different temperatures in the range of 67 to 90 C (Okechukwu and Rao 1995, Okechukwu and Rao 1996, Lagarrigue, Alvarez et al. 2008) indicated broadening of the distribution with an increase in mean particle size. Granule rupture was found to occur at longer times resulting in a decrease in mean diameter above 80° C. and 90° C. for cowpea and corn starch respectively. Measurements Average area of rice starch granules at different temperatures during heating is shown to be increasing indicating swelling of the granules. Most of the crystallinity of the granules is lost by the time it reaches 75 C (Yeh and Yeh 1993).

Extensive investigations have been carried out on swelling of polymer gels. It has been demonstrated that changes in temperature (Tanaka 1978), solvent composition (Hirotsu, Hirokawa et al. 1987), pH (Zhang and Peppas 2000, Kim, La Flamme et al. 2003) and ionic strength (Ricka and Tanaka 1985, Hooper, Baker et al. 1990) can induce changes in the state of the swollen network. Flory-Huggins theory (Flory 1953) has been applied to predict the swelling kinetics of normal, waxy and cross linked maize starch granules (Desam, G. P., J. S. Li, G. B. Chen, O. Your Ref.: 19.6179.1 ri Our Ref.: 78-14834

Campanella and G. Narsimhan (2018a). "A mechanistic model for swelling kinetics of waxy maize starch suspension." Journal of Food Engineering 222: 237-249. Desam, G. P., J. S. Li, G. B. Chen, O. Campanella and G. Narsimhan (2018b). "Prediction of swelling behavior of crosslinked maize starch suspensions." Carbohydrate Polymers 199: 331-340, the foregoing documents are incorporated by reference in their entirety)

Non-limiting, illustrative embodiments of the invention are described by the following clauses:

1. A process for predicting the storage modulus (G) of an aqueous starch suspension after the starch suspension is heated as described by a heating profile, wherein the starch suspension comprises a first size distribution of starch granules, the process comprising the steps of,
   a) selecting the starch;
   b) selecting the heating profile;
   c) predicting the amount of swelling of the starch granules to yield a second size distribution of starch granules;
   d) using the result of step c) for predicting the time dependent volume fraction of the starch granules ($\phi$) of the starch suspension after heating;
   e) using the master curve of normalized storage modulus ($G'/G_0'$) vs the volume fraction of the starch granules ($\phi$) to determine the normalized storage modulus of the heated starch suspension, wherein $G_0'$ is the limiting value of storage modulus for volume fraction approaching unity, and
   f) using the value for $G_0'$ of the starch to determine G'.

2. A process for selecting a heating profile for a starch suspension to yield a storage modulus (G') for the starch suspension in a desired range comprising the steps of:
   a) selecting a starch;
   b) selecting a heating profile;
   c) using the process of clause 1 to yield a predicted storage modulus (G');
   d) comparing the predicted (G') to the desired range for the storage modulus (G'); and repeating steps b) and c) until the predicted (G') is in the desired range.

3. The process of any of one of the clauses listed herein wherein the starch is selected from the group consisting of a waxy maize starch, a normal maize starch, a waxy rice starch, a normal rice starch, and a cross-linked normal maize starch.

4. The process of any of one of the clauses listed herein wherein the cross-linked normal maize starch is cross-linked with sodium trimetaphosphate.

5. The process of any of one of the clauses listed herein wherein the heating profile consists of heating the starch suspension to a first temperature (Temp1) between about 60° C. and about 90° C. and holding the suspension at the first temperature for Time1, where Time1 is about 5 to about 60 minutes; optionally followed by heating the starch suspension to a second temperature (Temp2) between about 60° C. and about 90° C., where Temp2 is greater than Temp1 and holding the starch suspension at the second temperature for Time2, where Time2 is about 5 to about 60 minutes.

6. The process of any of one of the clauses listed herein where Time1+Time2 is about 5 to about 60 minutes.

7. The process of any of one of the clauses listed herein wherein the first temperature is about 60° C. and the second temperature is about 65° C., about 70° C., about 75° C., about 80° C., about 85° C., or about 90° C.

8. The process of any of one of the clauses listed herein wherein the first temperature is selected from about 60° C., about 65° C., about 70° C., about 75° C., about 80° C., about 85° C., or about 90° C. and the suspension is not heated to the second temperature.

9. The process of any of one of the clauses listed herein wherein the starch is selected from the group consisting of a waxy maize starch, a normal maize starch, a waxy rice starch, a normal rice starch, and a cross-linked normal maize starch.

10. The process of any of one of the clauses listed herein wherein the starch suspension is included in a food formulation.

Section I

In each section, reference to an equation number refers to the equation with that number recited in that section.

Materials and Methods

Materials Waxy rice starch (Novation 8300), normal rice starch (Penpure 30) and Potato Staches (Novation 1600 and Penpure 80) were supplied by Ingredion Incorporated, NJ. Dimethyl sulphoxide (DMSO) was obtained from Fisher Scientific. Ethanol and Acetone were acquired from Sigma Aldrich chemical company. Starch Pasting Procedure Starch pasting was done in ARG2 Rheometer where aqueous starch mixture (8% w/w) is used. The procedure for starch pasting is similar to the procedure reported earlier (Desam, Li et al. 2018a, Desam, Li et al. 2018b). Initially pasting cell was heated to 45° C. and held for 1 minute, then heated at a rate of 15° C./minute until it reached the final desired temperature (60° C., 65° C., 70° C., 75° C., 80° C. or 85° C.). The starch was maintained at the desired temperature and samples were withdrawn at 0, 2, 5, 10, 15, 30, 45 and 60 minutes for particle size analysis after it reached the desired temperature.

Particle Size Distribution

Particle size distribution measurements were carried out by means of laser diffraction, using a Mastersizer 2000 instrument (Malvern Instrument) equipped with Hydro 2000 MU (A) dispersing unit. The experimental procedure can be found elsewhere (Desam, Li et al. 2018a, Desam, Li et al. 2018b). The data which was recorded in the form of volume % vs size range was converted to number density vs particle size using $$f_i(v_{i+1} - v_i) = \frac{vf_i/\bar{v}_i}{\sum_{i=1}^{N} vf_i/\bar{v}_i} \quad (1)$$

where $vf_i$ is the volume fraction of granules in $i^{th}$ interval ($v_i$, $v_{i+1}$), $\bar{v}_i = (v_i\ v_{i+1})/2$ and $f_i$ is the number density at $\bar{v}_i$.

Static Light Scattering

The Berry plot of starch solution was obtained using static light scattering as described earlier (G. P. Desam et al., 2018b). Briefly, sample was prepared by dissolving a gram of starch in 20 ml of 95% DMSO, The dried sample was then dissolved in water. The light scattering experiments were conducted at 25° C. in a ALV CGS-3 compact Goniometer system with the angular ranges from 30-150° in 10-degree increments. The refractive index (dn/dc) was taken as 0.146 ml/g.

Gelatinization by Differential Scanning Calorimetry

Enthalpy of gelatinization (4H) and gelatinization temperature are obtained from DSC as explained earlier (Desam, Li et al. 2018b). Starch sample was mixed with water to obtain a binary mixture with 92% moisture content. The starch samples were gelatinized in a DSC chamber (DSC, TA Instruments) by heating the sample from 30 to 90° C. at 15° C./min. The endothermic melting transition of starch was observed at 50-70° C. All measurements were obtained in triplicate. The onset ($T_o$), peak ($T_p$) and conclusion ($T_c$)

temperatures and the enthalpy of gelatinization (ΔH) in J/g of dry starch were calculated.

Mathematical Model for Swelling Kinetics of Starch

Upon exposure to aqueous medium, water diffuses into the starch granule because of the difference in the chemical potential thereby resulting in its swelling. The total free energy of the granule can be written as the sum of (i) free energy of mixing of the starch network with the solvent and (ii) free energy of elastic deformation of the network and (iii) electrostatic free energy of charged network due to uneven distribution of counter ions. Eventually, the granule attains equilibrium at which the net osmotic pressure acting on the granule is zero, i.e. the total free energy is at a minimum. In the following, a model is employed that was developed for swelling of starch granules that is based on the framework of polymer swelling theory (Desam, Li et al. 2018a). Therefore, from Flory Huggins theory, the chemical potential of water inside the granule is given by $$\mu_1 - \mu_1^0 = RT\left[\ln(1-\phi) + \phi + \chi(T)\phi^2 + \nu_1\left(\frac{v_e}{V}\right)\left(\phi^{1/3} - \frac{\phi}{2}\right)\right] \quad (2)$$

where, $\phi$ is the volume fraction of starch within the granule, $\chi(T)$ is the Flory Huggins parameter at temperature T, $R_g$ is the gas constant, T is the temperature, $v_i$ is the molar volume of the unswollen starch granule, V is the total volume of starch network within the granule, $v_e$ is the effective number of moles of chains in the network, i is the degree of ionization of the starch granule, z is the valence number of electrolyte, $V_m$ is the molar volume of the starch monomer $v_i(v_e/V)=v^*$ being the fraction of chains that are crosslinked. and c is the bulk electrolyte molar concentration. The first two terms on the right hand side arise from entropy of mixing, the third term involving Flory Huggins parameter arises from the enthalpy of mixing, the fourth term arises from the elastic resistance to swelling and the final term is because of electro static resistance to swelling. For the starch systems that were investigated in this study, there is no contribution from the electrostatic resistance since the starch granules are not charged. Flory Huggins $\chi$ parameter gives the change in enthalpy of interaction when a starch segment is transferred from its own environment to solvent (water) and is therefore a measure of starch-solvent interaction. Now, $$\frac{\partial \chi}{\partial T} = -\frac{\Delta H}{RT^2} \quad (3)$$

where ΔH is the molar enthalpy of interaction of starch with water (solvent). The rate of diffusion of water is governed by the gradient of its chemical potential and can thus be described by $$\frac{\partial \mu_1}{\partial t} = \frac{1}{r^2}\frac{\partial}{\partial r}\left(Dr^2\frac{\partial \mu_1}{\partial r}\right) \quad (4)$$

In the above equation, D is the diffusion coefficient of water (solvent) into the granule at temperature T, t is the time and r is the radial position within the spherical granule. The pore diffusion coefficient D is proportional to pore radius, temperature and inversely proportional to tortuosity is given by $$D(T) = D_0\left(\frac{T}{T_0}\right)\frac{(1-\phi)^{1/3}}{tor(\phi)} \quad (5)$$

where tor($\phi$)=$(1-\phi)^{-c}$ in order to account for its decrease due to swelling as well as softening of the granules (Matyka, Khalili et al. 2008).

Since the granule is heated, the temperature profile within the granule is changing with time and is given by the following unsteady state heat conduction equation, $$\frac{\partial T}{\partial t} = \frac{1}{r^2}\frac{\partial}{\partial r}\left(\alpha(\phi, T)r^2\frac{\partial T}{\partial r}\right) \quad (6)$$

where $\alpha(\phi,T)$ is the thermal diffusivity of the starch grain.

Defining the following dimensionless variables, the above equation can therefore be written in terms of dimensionless variables as, $$\tau = \frac{\alpha_0 t}{R_0^2}; r^* = \frac{r}{R_0}; T^* = \frac{T-T_0}{T_0}; \mu_1^* = \frac{\mu_1 - \mu_1^0}{RT_0}; \quad (7)$$

$$Pe = \frac{D_0}{\alpha_0}; D^* = \frac{D}{D_0}; \alpha^* = \frac{\alpha}{\alpha_0}; H^* = \frac{HR_0^2}{T_0\alpha_0}$$

Where H is the heating rate and subscript 0 refers to the value at reference temperature $T_0$. The dimensionless diffusion and heat conduction equations are given by $$\frac{\partial \mu^*}{\partial \tau} = \frac{Pe}{r^{*2}}\frac{\partial}{\partial r^*}\left(D^* r^{*2}\frac{\partial \mu^*}{\partial r^*}\right) \quad (8)$$

$$\frac{\partial T^*}{\partial \tau} = \frac{1}{r^{*2}}\frac{\partial}{\partial r^*}\left(\alpha^* r^{*2}\frac{\partial T^*}{\partial r^*}\right) \quad (9)$$

These are solved with the following initial and boundary conditions.

$$\tau = 0 \quad \phi = \phi_0; T^* = 0 \quad (10)$$

$$r^* = 0 \quad \frac{\partial \mu^*}{\partial r^*} = 0; \frac{\partial T^*}{\partial r^*} = 0 \quad (11)$$

$$r^* = R^*(\tau) \quad \mu^*(\phi^s) = 0; \quad (12)$$

$$T^* = H^*\tau \quad \text{if } T^* < T^*_{final}$$

$$= T^*_{final} \quad \text{otherwise}$$

In the above equation, $\phi_0$ is the equilibrated starch volume fraction inside the granule at initial temperature and $R^*(\tau)=R(\tau)/R_0$, $R(\tau)$ being the radius of the swollen granule at dimensionless time $\tau$. Since the total volume of starch within the granule is conserved, (Desam, Li et al. 2018a)

$$R^*(\tau) = \left(\frac{\phi_0}{\bar{\phi}(\tau)}\right)^{1/3} \quad (13)$$

$\bar{\phi}(\tau)$ being the average starch volume fraction within the granule at dimensionless time t. Since this model does not account for granule breakup, model predictions were not made in cases where breakup is predominant.

Results and Discussion

Figure 2:
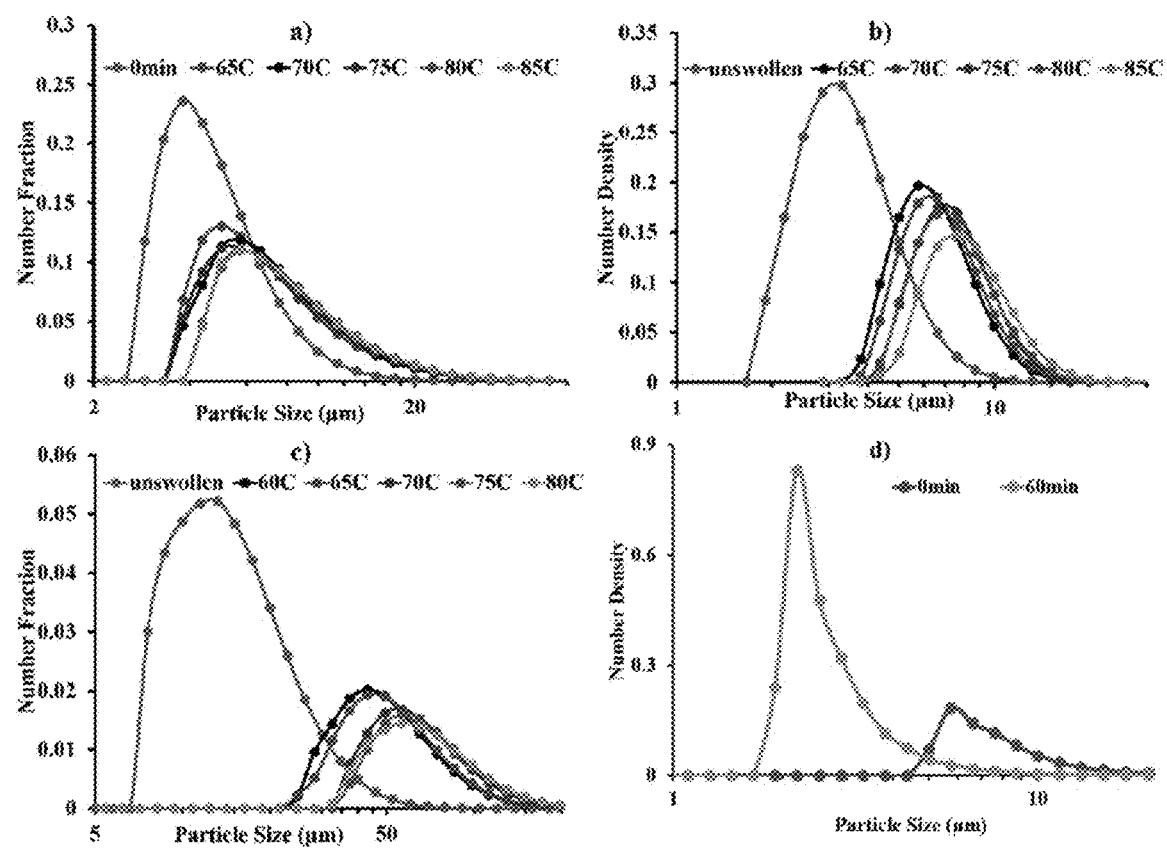
FIG. 2 Granule size distribution curves after heating for 60 min at different temperatures for a) WRS b) NRS c) Novation 1600 and d) Penpure 80
Figure 3:
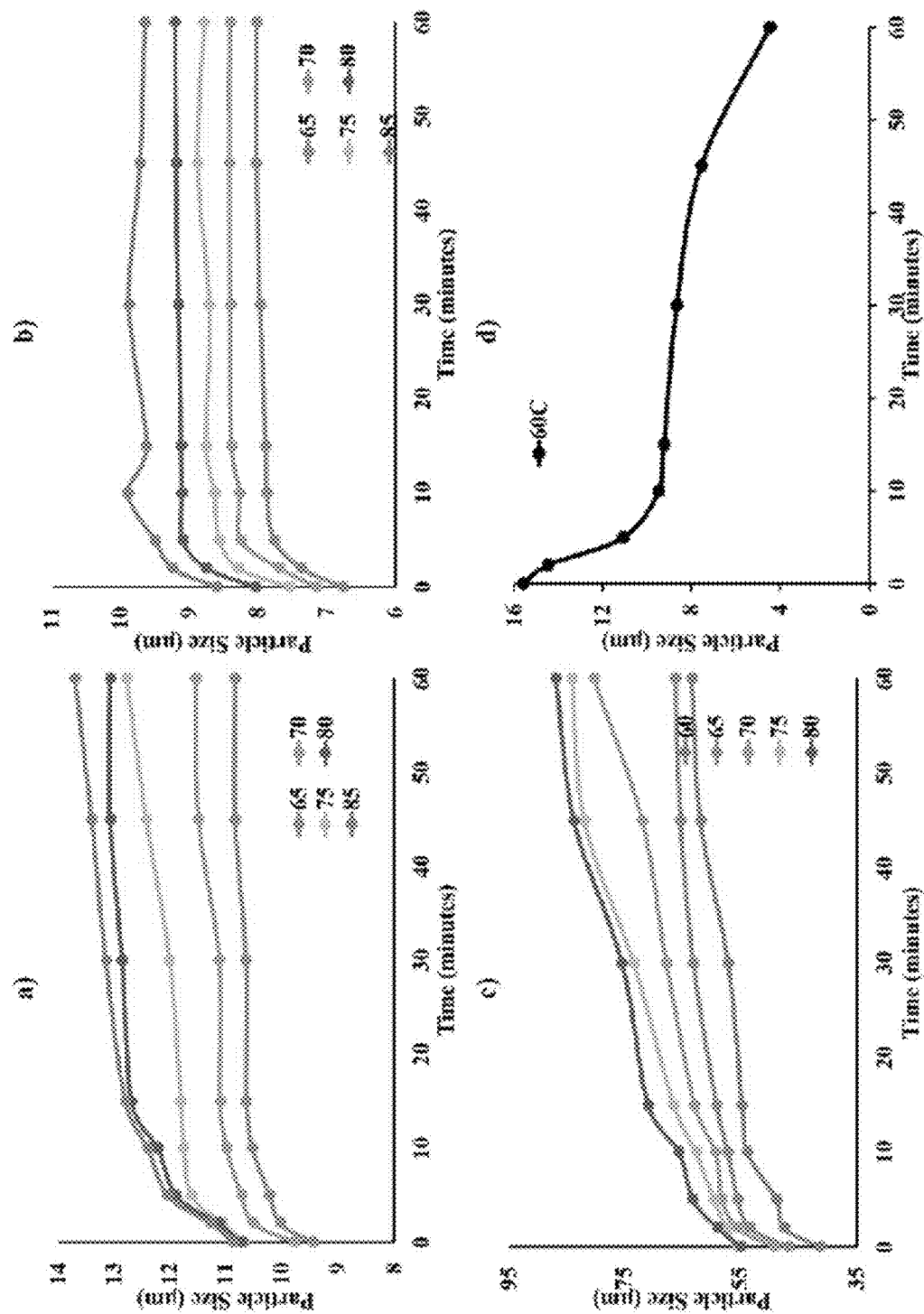
FIG. 3 Average granule size vs time for a) WRS b) NRS c) Novation 1600 and c) Penpure 80

Granule Size Distribution Typical evolution of starch granule distribution for WRS, NRS and potato starch (Novation 1600 and Penpure 80) at 80° C. is shown in FIG. 1. Similar plots at different temperatures (65, 70, 75 and 85) for WRS, NRS and potato starches were made (data not shown). The size distribution is found to shift to larger sizes at longer holding times with this shift being more pronounced at initial holding times for rice starches. However, this shift is found to be gradual for Novation 1600. This behavior is consistent with earlier reported results for waxy maize starch (Desam, Li et al. 2018a), normal maize starch and its crosslinks (Desam, Li et al. 2018b). For Penpure 80, even at 60° C., the size distribution shifts to smaller sizes at longer holding times indicating breakup of the granule. Granule size distribution of waxy rice starch is broad with the size distribution typically ranging from 3 to 60 while the granule size distribution of NRS shows a narrow distribution ranging from 3 to 25 μm with an increase in the number fraction of smaller particle 209 size (FIG. 1b). Granule size distribution of Novation 1600 and Penpure 80 is also found to be broad with the size distribution typically ranging from 10 to 120 μm (FIG. 1d). At 60° C., however, the granule size for Penpure 80 is found to be smaller than the initial distribution (FIG. 1d). This is believed to be due to breakage of Penpure 80. FIG. 2 compares the initial granule size distribution with the distributions at 60 min for different temperatures. From the figure, it can be observed that the distribution shifts to the right with an increase in temperature indicating thereby that swelling increases with temperature.

The average granule size vs time for different starch samples at holding temperatures of 65, 70, 75, 80 and 85° C. are shown is FIGS. 3a-3e. Consistent with earlier observations, these results also indicate that swelling increases with temperature and holding time for rice starches and novation 1600. Consistent with reported granule size distribution results as discussed above, the average granule size for Penpure 80 decreases with hold time at all temperatures. The swelling ratio of WMS and NRS, defined as the ratio of final and initial average granule sizes, ranges from 1.62-2.51 and 1.56-2.21 respectively. For Novation 1600 swelling ratio is between 1.8-4. For rice starches and Novation 1600 it is observed that there is significant increase in average particle size from 0 min to 2 min at different temperatures. Subsequent increase in size with time is slower except for Novation 1600 which reaches equilibrium around 45 minutes while the rice variants reach equilibrium around 15 minutes.

Light Scattering and Second Virial Coefficient

Berry plots of static light scattering for all starches in water at 25° C. were prepared. Starch concentration range for these measurements for WRS, NRS and novation 1600 are from 5 to 3.1, 4.4 to 2.9 and 3.8 to 2.5 gm/liter respectively. The second virial coefficient and molecular weight are inferred from the berry plot using the following equation.

$$\left(\frac{KC}{R_\theta}\right)^{1/2} = \left(\frac{1}{M_W}\right)^{1/2}\left(1 + \frac{1}{6}q^2 R_g^2\right) + A_2 M_W C \quad (14)$$

where q, the scattering vector for vertically polarized light, is denoted by $$q = \frac{4\pi n_0 \sin(\theta/2)}{\lambda},$$

λ is the wavelength, no is the refractive index of the solvent and θ is the solid angle.

The Flory Huggins χ parameter is inferred from the second virial coefficient using $$\left(\frac{1}{2} - \chi\right) = A_2 \frac{\bar{v}_1}{\bar{v}_2^2} \quad (15)$$

where $\bar{v}_1$ is the molar volume of solvent and $\bar{v}_2$ is the partial specific volume of starch. The molecular weight, second virial coefficient, and the Flory Huggins parameter inferred from the berry plot for different starch samples are given in TABLE 1.

TABLE 1

| Type of Starch | Gelatinization $T_g$ (K) | Mw (g/mole) | ΔH (J/mol) | χ | v* |
|---|---|---|---|---|---|
| WRS | 329.067 | 276000 | 298425 | 0.5 | 0.0388 |
| NRS | 330.24 | 147467 | 134521 | 0.5 | 0.0298 |
| Novation 1600 | 329.753 | 267600 | 291505 | 0.5 | 0.004603 |

TABLE 2

| Starch | v* | b |
|---|---|---|
| WMS | 0.004 | 3.5 |
| Novation1600 | 0.0046 | 3.75 |
| NMS | 0.006 | 4 |
| Crosslink 1 | 0.02 | 5 |
| NRS | 0.0298 | 5.5 |
| WRS | 0.038 | 6 |
| Crosslink 2 | 0.079 | 6.5 |

Estimation of Enthalpy of Gelatinization.

The enthalpy of gelatinization (ΔH J/g) and gelatinization temperature ($T_g$) for WRS, NRS and Novation 1600 were measured using DSC thermograms are presented in TABLE 1.

Estimation of v* from Equilibrium Swelling at Different T

The starch granules eventually reach equilibrium at sufficiently long times when the chemical potential of water inside the granule becomes equal to that in the surrounding medium (Baumgartner, Kristl et al. 2002). Therefore, at equilibrium, μ*(T)=0, which implies that (Ofner and Bubnis 1996)

$$v^*(T) = -\frac{\ln(1 - \phi_{eq}(T)) + \phi_{eq}(T) + \chi(T)\phi_{eq}(T)^2}{\left(\phi_{eq}(T)^{1/3} - \frac{\phi_{eq}(T)}{2}\right)} \quad (16)$$

In the above equation, $\phi_{eq}(T)$, the equilibrium volume fraction of starch inside the granule at temperature T is given by, $$\phi_{eq} = \phi_0\left(\frac{\bar{V}_{eq}}{\bar{V}_0}\right)$$

where $\bar{V}_{eq}$ and $\bar{V}_0$, equilibrium and initial average granule volumes respectively, are obtained from the granule size distributions. The average of calculated v* at different temperatures using eq. (14) for WRS, NRS and Novation 1600 are given in TABLE 1. The value of v* is found to be inversely related to the swelling power. v* was of the increasing order Novation 1600<NRS<WRS. Their swelling power, however, exhibited the opposite trend, i.e. WRS<NRS<Novation 1600, consistent with the earlier reported results (Tester and Morrison 1990a, Tester and Morrison 1990b).

Relationship Between Parameter b and Starch Structure

Figure 4:
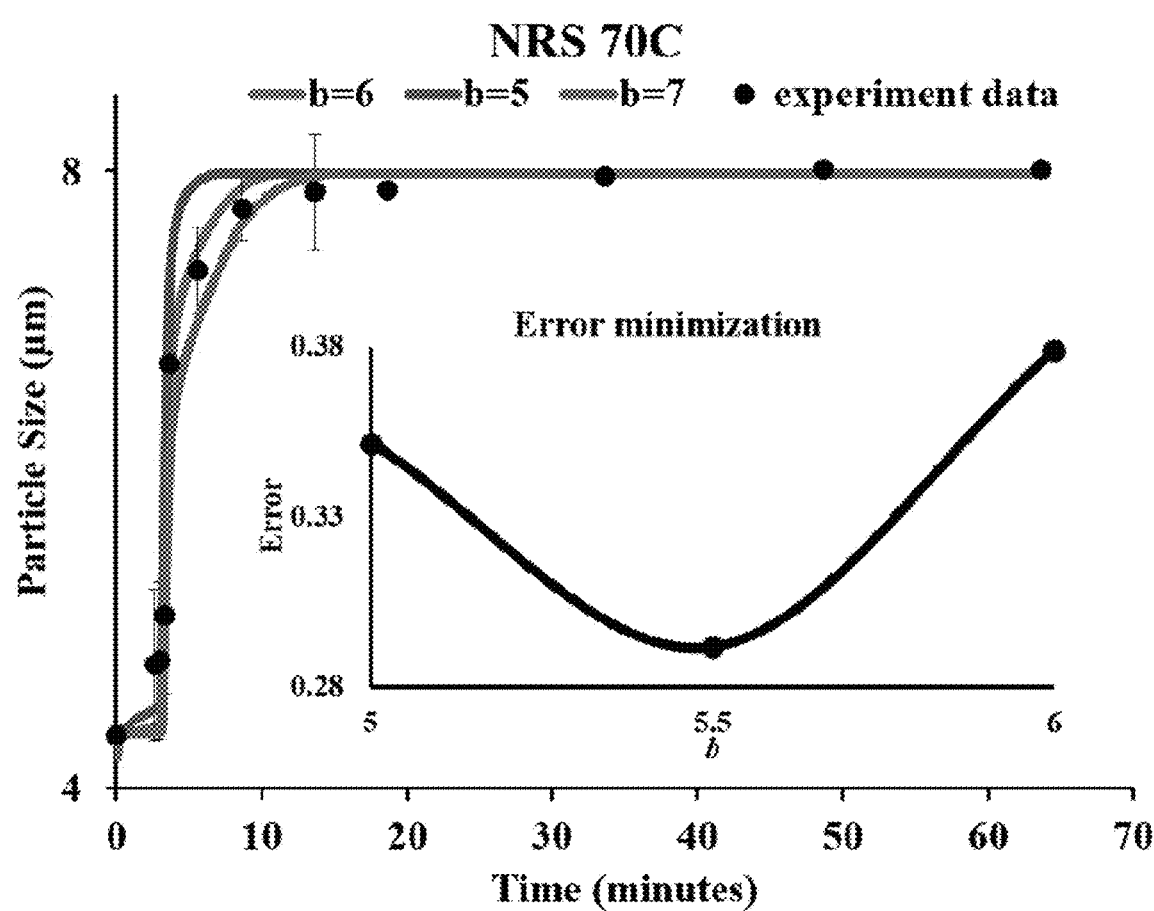
FIG. 4 Effect of parameter b on swelling kinetics at 70° C. on Normal Rice Starch and error minimization in inset FIG. 5 Effect of extent of crosslinking v* on parameter b from Table 2
Figure 5:
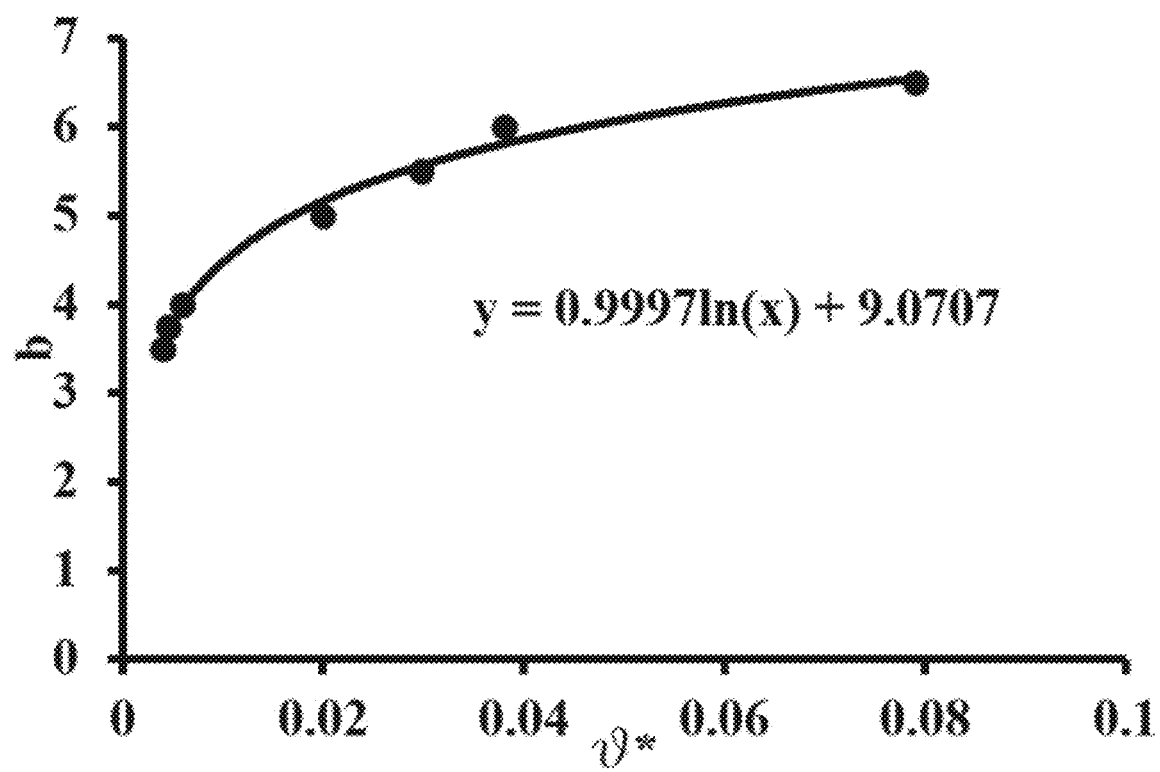

Granule radius vs time for different values of parameter b at 70° C. for NRS are shown in FIG. 4. Since tortuosity is higher for larger values of b, the swelling is found to be less and equilibrium is approached at longer times for higher values of b. The best fit of parameter b for NRS is obtained by minimizing the root mean square of error (as shown in the inset of FIG. 4) between predictions and experimental data of number average starch granule size at different times and temperatures. Values of b for WRS and Novation 1600 were also obtained using the same procedure and shown in FIGS. 13. These values were found to lie in the range of 4 to 7. Values of parameter b for different starches are plotted as a function of v* as obtained from eq. (14) as described above in FIG. 5. b is found to increase with v* (TABLE 2) In the case of porous medium formed by packed bed of particles, the exponent b was found to be dependent on the particle shape increasing as the particle become more non-spherical (Jackson, Taylorsmith et al. 1978). Fit of tortuosity measurements to a power law indicated a b value of 0.53 (Thorat, Stephenson et al. 2009) for Li ion battery materials, a value of 0.4 for silica packed bed (Delgado 2006), a value ranging from 1.39 to 2 for packed bed of quartz sand ((Jackson, Taylorsmith et al. 1978, Thorat, Stephenson et al. 2009) and a value of 0.33 to 0.5 for packed bed of spherical particles (Shen and Chen 2007). Much higher values of b for starch compared to those for other granular materials is believed to be due to different structure of starch granule. As is well known, starch granule is formed by alternate amorphous and crystalline regions with the crystalline regions consisting of smaller and more tortuous pores (Baker, Miles et al. 2001). Consequently, the pore structure within a starch granule is quite different from that of packed bed of spherical particles and is closer to the structure of packing of highly non spherical particles.

Comparison of Model with Experiments

Figure 6:
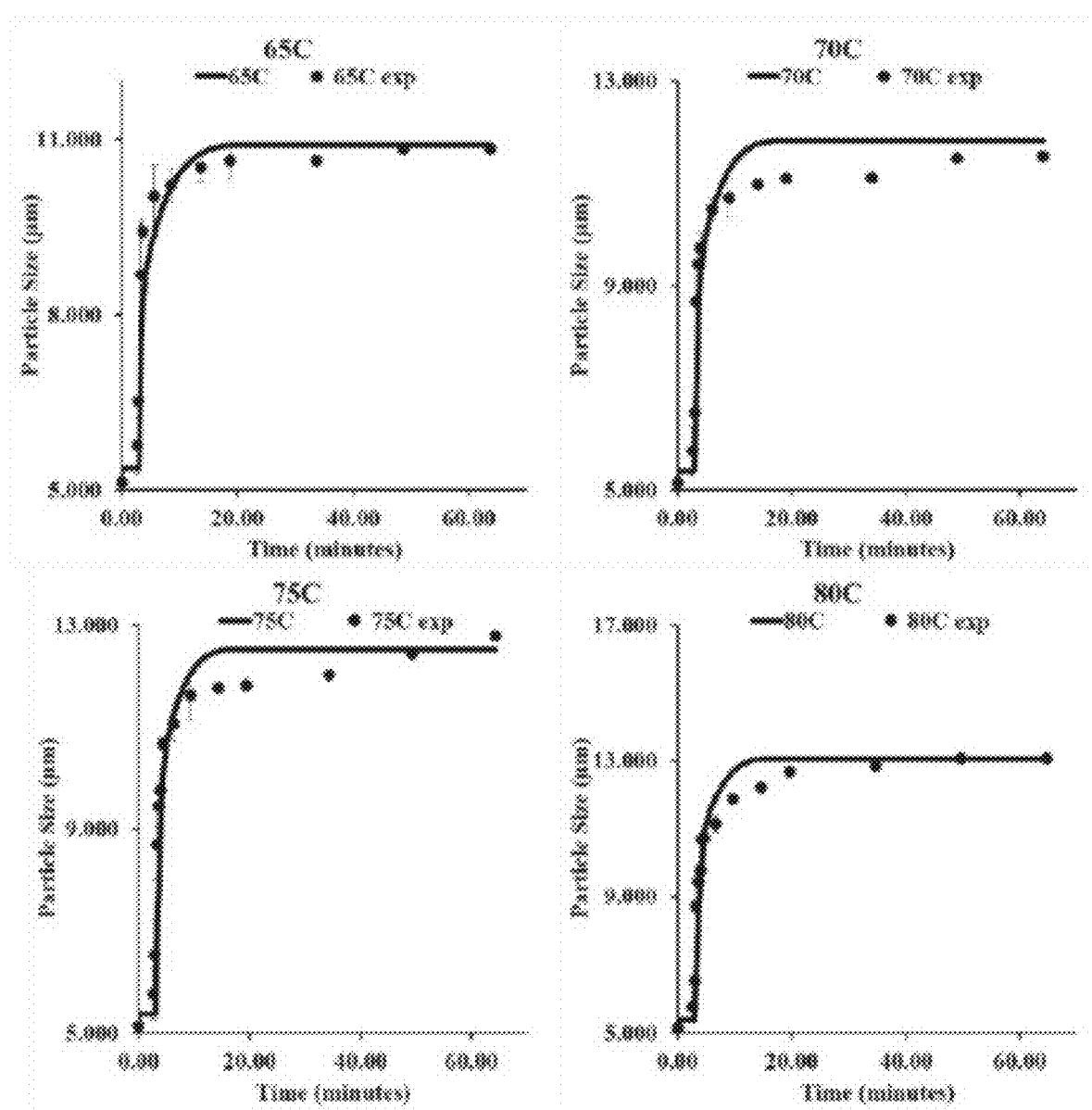
FIG. 6 Comparison of experimental data of number average granule size vs time with predictions (solid lines) for WRS. The model parameters for the predictions are given in Table 1.
Figure 6:
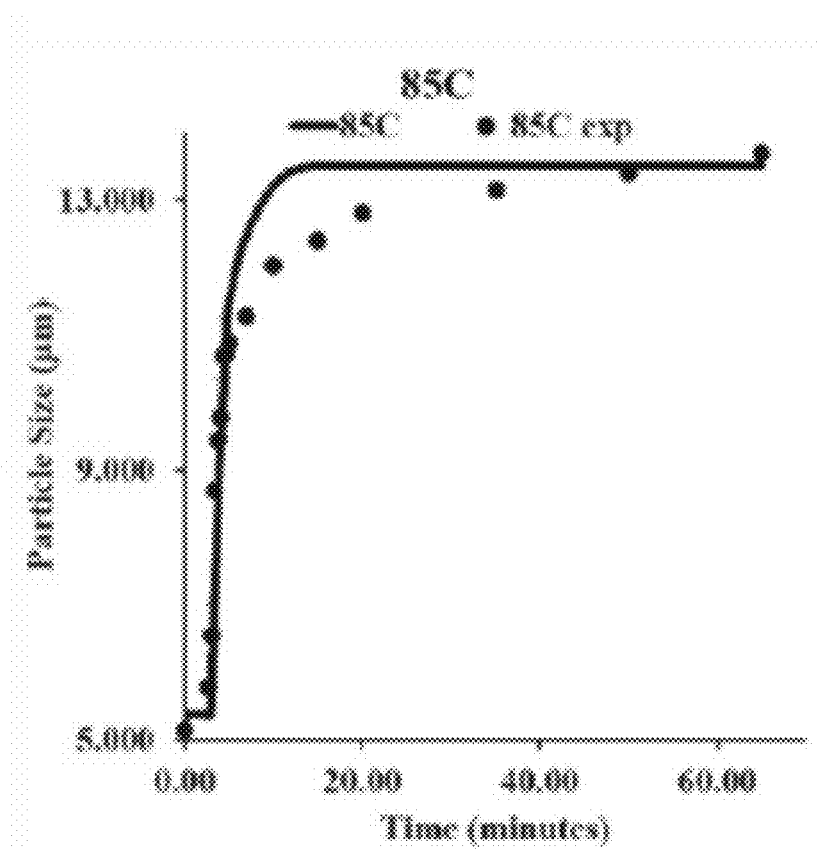
Figure 7:
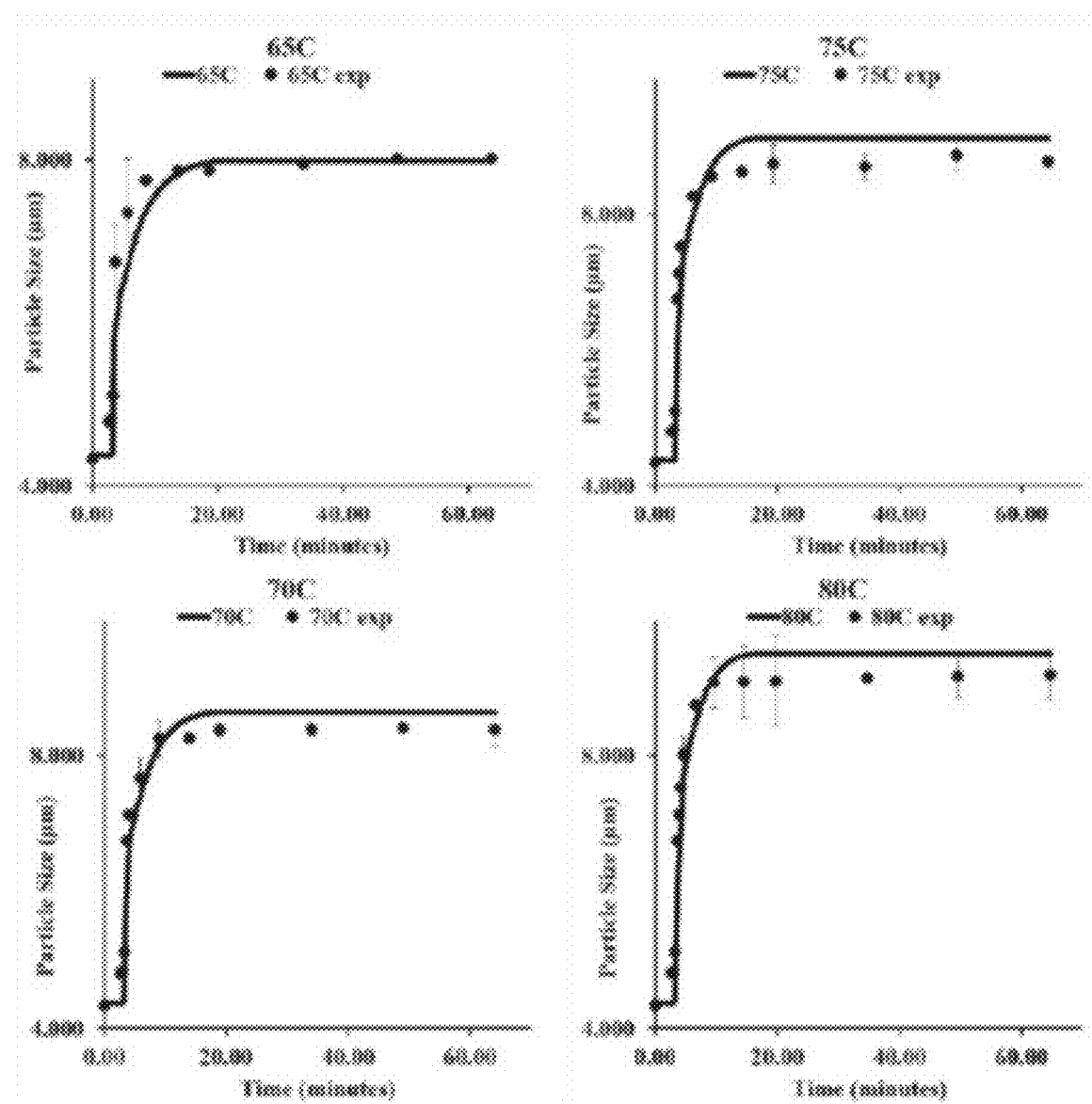
FIG. 7 Comparison of experimental data of number average granule size vs time with predictions (solid lines) for NRS. The model parameters for the predictions are given in Table 1.
Figure 7:
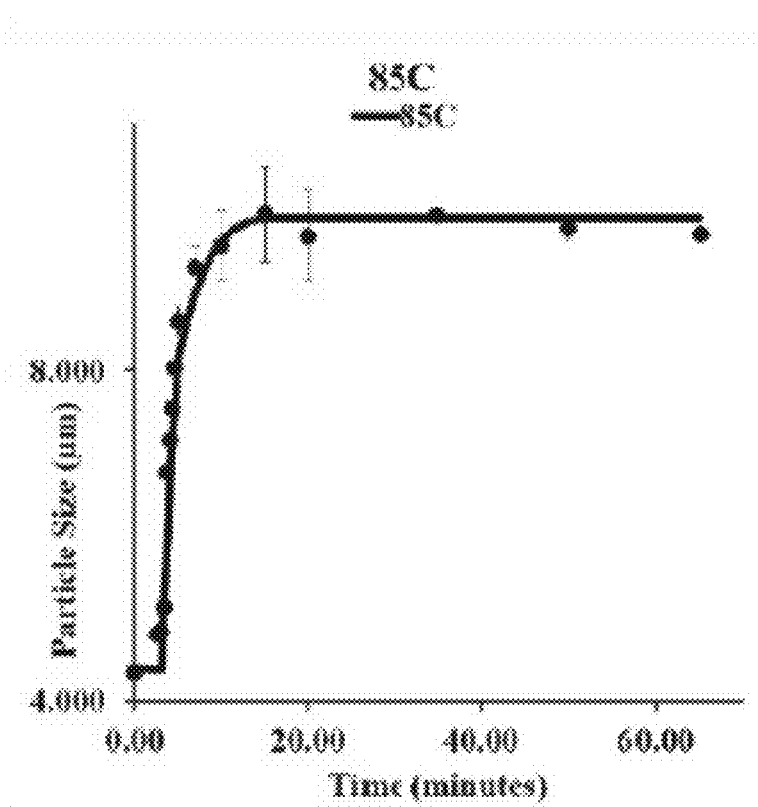
Figure 8:
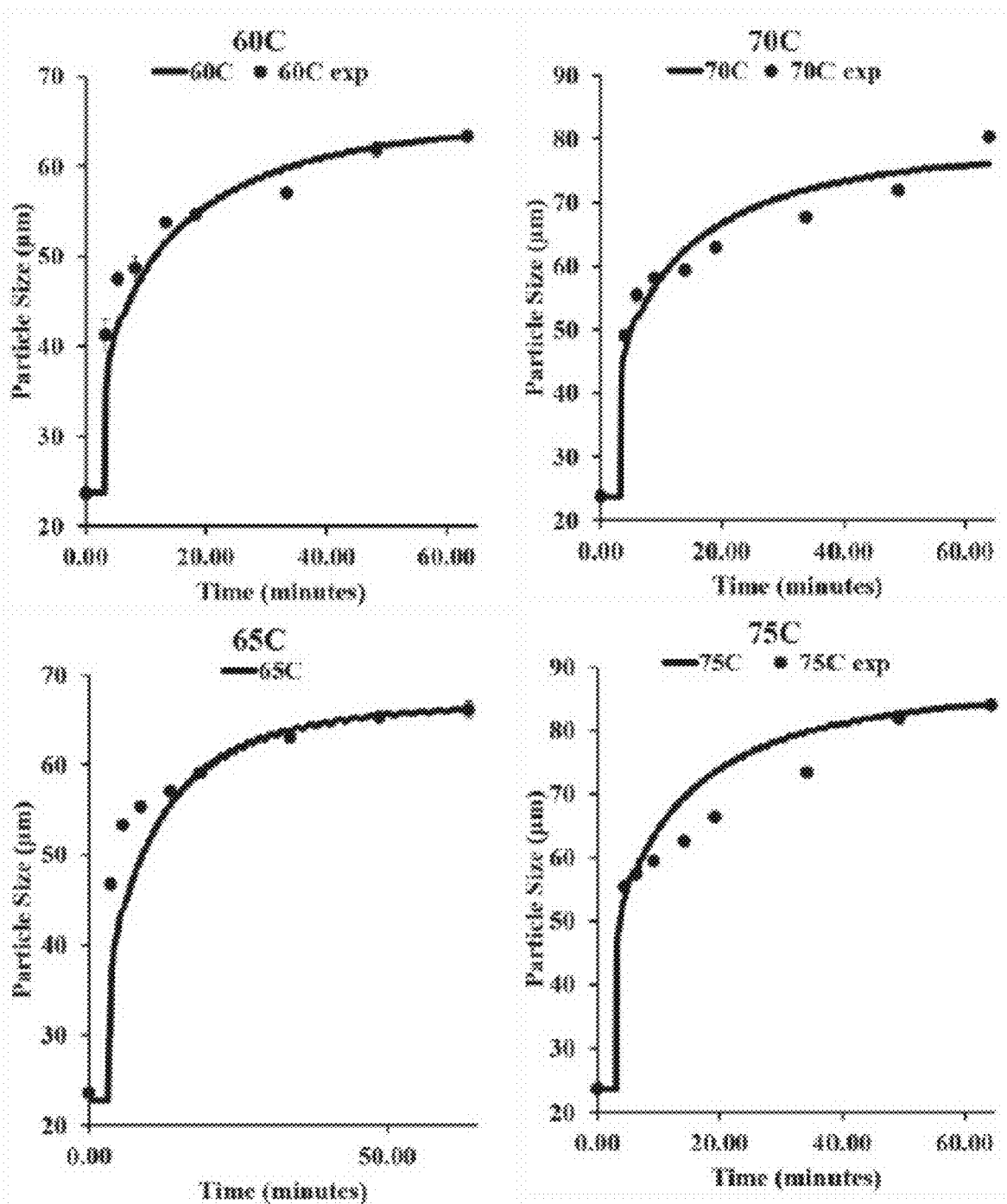
FIG. 8 Comparison of experimental data of number average granule size vs time with predictions (solid lines) for Novation 1600. The model parameters for the predictions are given in Table 1.
Figure 8:
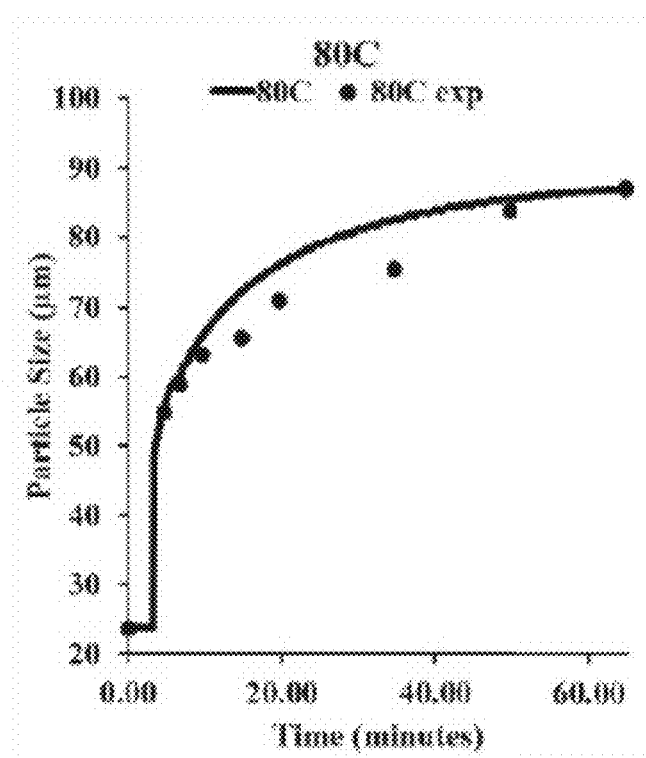

Model predication of the average granule size at different times for WRS, NRS and Novation 1600 when heated at different temperatures (65, 70, 75, 80 and 85° C.) are compared with the experimental data in FIGS. 6-8 respectively. The average granule size was calculated using eq. (10) as explained in the model section. The parameters v*, $\chi_0$, $\Delta H$ and b for different samples are given in TABLE 1. In these calculations, the granule size is considered to be uniform at the initial average granule size. The model predictions agree well with experimental data for all three samples. Model comparison was not made for Penpure 80 because granules exhibited breakage during swelling.

Figure 9:
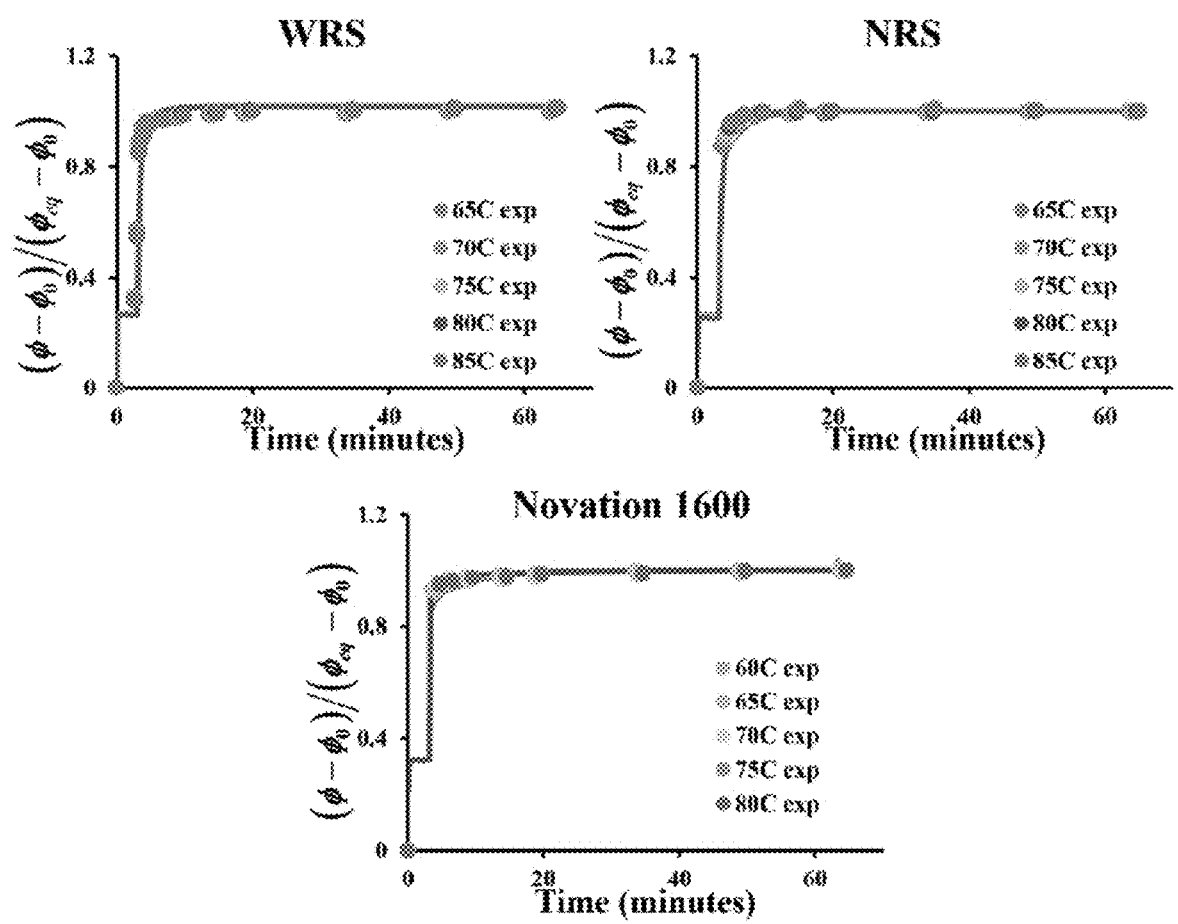
FIG. 9 Plot of incomplete swelling $(\phi-\phi_0)/((\phi_{eq}-\phi_0)$ vs time at different temperatures FIG. 10 Comparison of predicted cumulative number fraction (solid lines) with experimental data (points) for a) WRS b) NRS and c) Novation at 75 C. The model parameters for the predictions are given in Table 1
Figure 10:
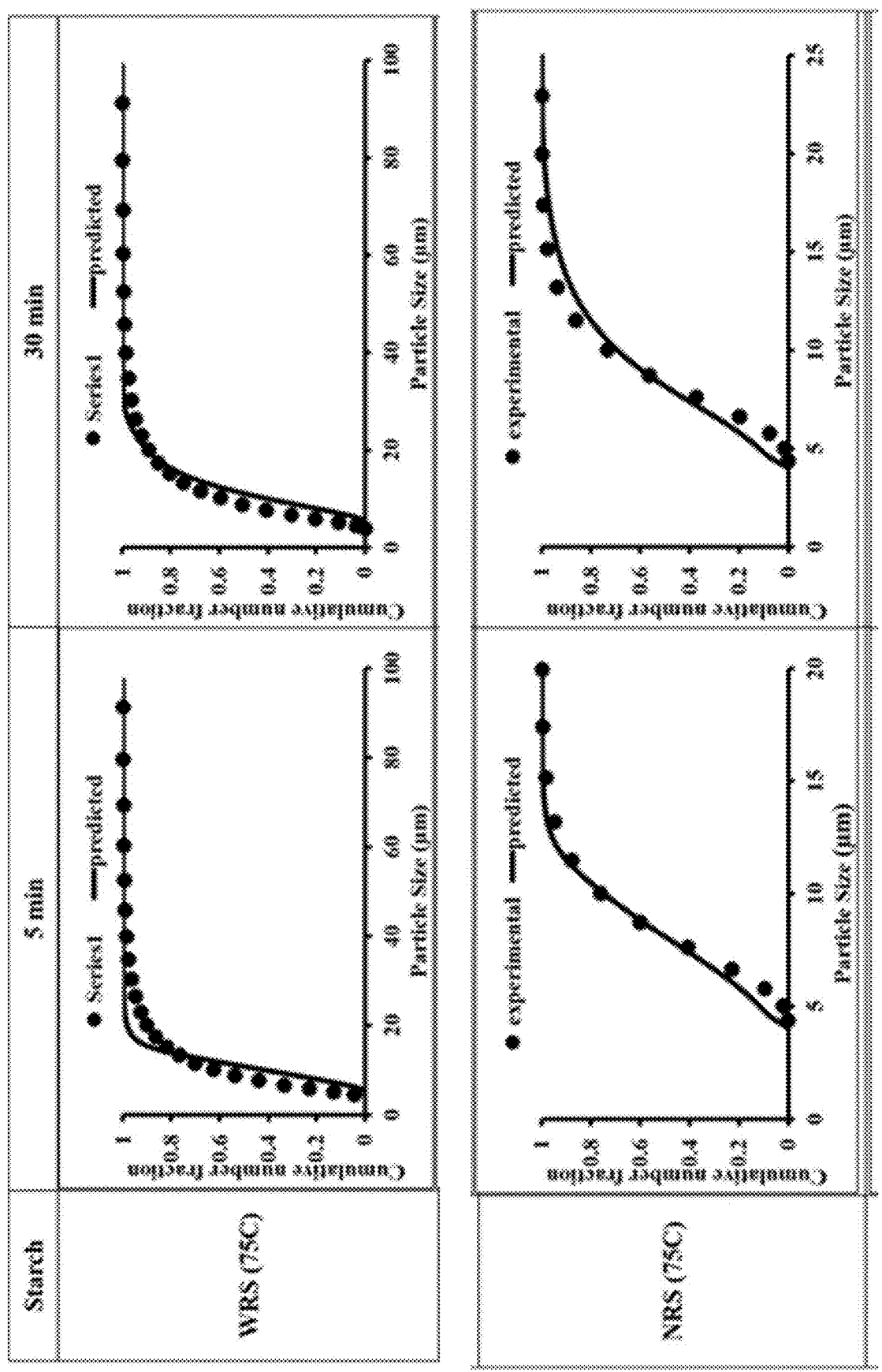
Figure 10:
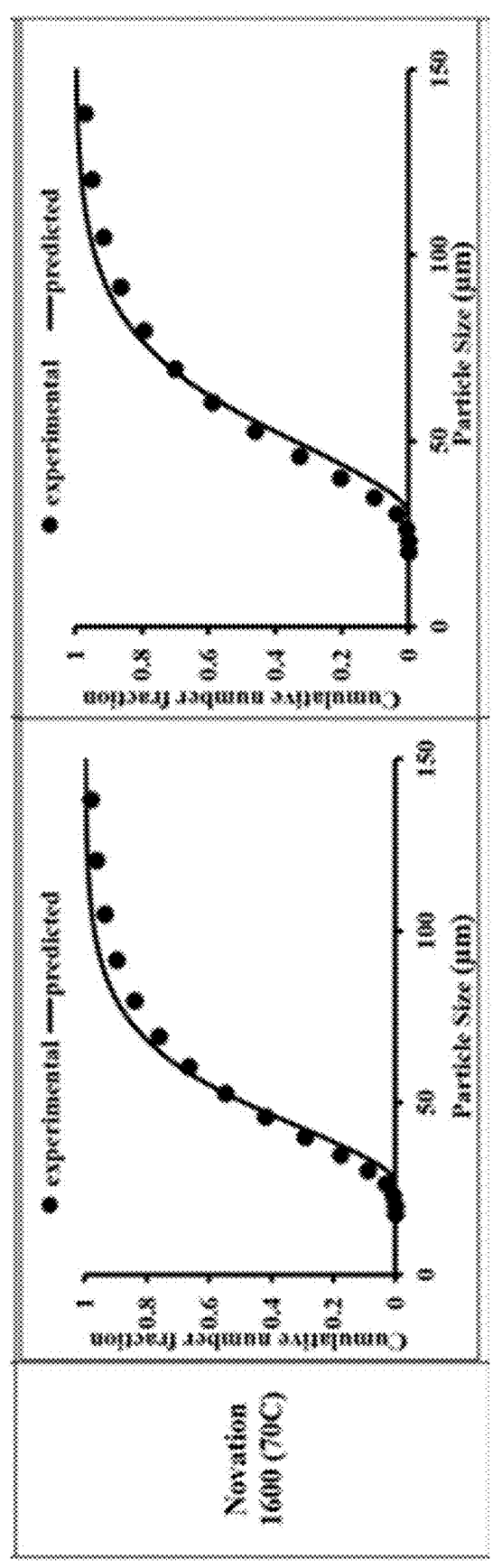

Comparison is also shown as a plot of incomplete swelling defined as $(\phi-\phi_0)/(\phi_{eq}-\phi_0)$ vs time at different temperatures in FIG. 9. The effect of temperature is built into the equilibrium starch volume fraction $\phi_{eq}$. It is interesting to note that the experimental data for normal maize with different levels of crosslink at different temperatures collapse into a single curve. Since the initial starch granules consist of different sizes, these granules will grow at different rates. As a result, the coarsening of granule sizes due to swelling will be different for different initial granule sizes. Population balance analysis is used to predict the evolution of granule size distribution which is described earlier (Desam, Li et al. 2018a). The evolution of cumulative number fraction of starch granules at different temperatures are predicted using methods described in our earlier publication (Desam, Li et al. 2018a). Comparison of predicted cumulative number fraction of NWS, NRS and Novation 1600 with experimental values at 70° C. at 5 and 15 min are shown in FIG. 10 respectively. Similar comparisons at 65° C., 75° C., 80° C. and 85° C. were made (data not shown). Predicted cumulative number fraction compares well with experimental values at all temperatures.

Section II

A methodology useful to predict the storage modulus (G') of starch paste due to granule swelling, given the physical properties of the starch granule and temperature history. This was demonstrated on experimental measurements of granule size distribution and G' for 8% w/w suspensions of waxy maize, normal maize, waxy rice, normal rice, and cross linked normal maize—all heated to different temperatures (65 to 90° C.) and holding times (2 to 60 min). Experimental data of storage modulus G' vs volume fraction $\phi$ surprising fall onto a master curve when G' is normalized by its limiting value $G_0'$. $G_0'$ is estimated from a foam rheology theory and measurements of granule interfacial energy. The master curve, coupled with previously developed methods to predict the granule size distribution over time, allows semi-empirical prediction of the storage modulus G' due to swelling.

Introduction

Described herein is starch pasting, the process by which aqueous starch suspensions thicken upon heating. Such suspensions are made up of discrete granules of size 1-50 microns, depending on the starch variety present (e.g., corn, rice, etc.) and the chemical functionalization (e.g., crosslinking) of the granules. Starch granules consist of concentric rings of amorphous and semi-crystalline layers. The amorphous layers are predominantly amylose, a linear glucose polymer consisting of α 1-4 linkages whereas the semi crystalline layers are predominantly amylopectin, a branched glucose polymer consisting of α 1-4 and α 1-6 linkages. Upon heating, starch granules take up water and increase in size until they form a packed microstructure. This swelling is only appreciable above a critical temperature (i.e., gelatinization temperature), and is resisted by the elasticity of the granule network. Excess swelling or internal granule pressure can lead to rupture, which leaches the granule's internal components (predominantly amylose) into the aqueous medium, thus resulting in an increased viscosity. The combined effects of increased volume fraction of granules (due to swelling) and the increased aqueous phase viscosity results in thickening of the starch dispersion.

Starch pasting influences the texture of a variety of food products such as canned soups, gravies, sauces, baby foods, fruit pie fillings, puddings, and batter mixes for deep fried foods. In non-food products, starch dispersion rheology and pasting are important in operations that range from paper coating to the fabrication of paints. (Singh, Kaur et al. 2007) Currently, most studies of starch pasting remain empirical in nature, requiring significant testing/investment when formulating new materials for food and bioprocess industries. (Singh, Kaur et al. 2007) A physics-based, predictive model that can connect the micro-scale structure of starch and its processing conditions to its pasting behavior may be helpful for the rational design of starches with desirable functional properties and texture. Described herein is a methodology to predict the texture (linear viscoelasticity) of final product (starch paste) given the physical properties and processing conditions. It is believed that such a methodology would be useful and may result in considerable savings to the bioprocessing industry. This methodology builds on an earlier mechanistic model (Desam, Li et al. 2018a) that predicts the kinetics of starch swelling from the knowledge of its physical properties and temperature history. The experimental data of storage modulus for different starch varieties and temperature histories is presented described herein. A master curve for storage modulus only in terms of volume fraction of the swollen starch granules has been discovered. Prediction of the storage modulus of starch paste for different starch varieties and processing conditions is possible by combining earlier models of size change during heating with this master curve.

Previous Studies on Starch Pasting

The pasting behavior of starch depends on various factors such as starch type (amylose/amylopectin content), morphology, starch concentration, heating temperature, temperature history, and other ingredients in the formulation. Starch pasting has been extensively investigated for a variety of starch types (Singh, Singh et al. 2003, Ai and Jane 2015). It is found that starch granules only significantly swell above its gelatinization temperature, with its swelling rate increasing dramatically at higher temperatures (Bagley and Christianson 1982). During swelling, the suspension is predominantly elastic. The storage modulus dramatically rises around the gelatinization temperature, with this effect being more pronounced at higher starch concentrations (Ellis, Ring et al. 1989, Evans and Lips 1992, Tsai, Li et al. 1997, Singh and Singh 2001).

Typically, at low starch concentrations, the storage modulus G' increases with temperature and plateaus at higher temperatures. At higher starch concentrations, however, the modulus peaks soon after gelatinization and decreases at higher temperatures possibly due to softening and breakage of granules. Larger size fractions of starch suspensions when heated gave a higher G' with a lower gelatinization temperature compared to smaller size fractions (Singh and Kaur 2004). The latter behavior may be attributed to the softening of granules at higher temperatures (Keetels and Van Vliet 1994). The deformation of swollen starch granules may be retarded for non-waxy starches because entangled amylose molecules are not leached out and therefore provide more rigidity to granules (Hoover and Hadziyev 1981). At low starch concentrations, the storage modulus is found to be in the order potato>corn>wheat. (Tsai, Li et al. 1997). At higher starch concentrations, however, storage modulus for corn starch is higher than that for potato starch.

As a result of dense packing of swollen granules, starch paste exhibits an yield stress which is higher for higher starch concentrations (Evans and Haisman 1980, Doublier 1981, Navickis and Bagley 1983). Above the yield stress, the starch paste exhibits a Newtonian flow behavior at very low shear rates, becoming shear thinning at higher shear rates. The flow behavior index was found to increase dramatically with starch concentration at low concentrations and levels off at higher concentrations (Evans and Haisman 1980).

Materials and Methods:

The starches used in the examples were waxy maize starch (WMS) (Novation™ 2300), normal maize starch (NMS) (Melojel™), waxy rice starch (WRS) (Novation™ 8300), and normal rice starch (NRS) (PenPure™30) purchased from Ingredion Incorporated (Bridgewater, N.J., USA). Note that starches in Novation line are resistant to heat and shear. They tend to hold their integrity and are less likely to rupture when heated to higher temperatures for longer times. In addition, NMS crosslinked to two different extents was also used. NMS was crosslinked using sodium trimetaphosphate. The details of crosslinking procedure are given in an earlier publication (Desam, Li et al. 2018b).

Starch Paste Preparation

Starch pasting was carried out in ARG2 Rheometer with a starch pasting cell. Two grams of starch sample was mixed with 23 g of water (8% w/w). The pasting cell was heated to 45° C. at the rate of 15° C./min and held at 45° C. for 1 min. The cell was then heated to final holding temperature T>60° C. at the rate of 15° C./min, and then held for 5-60 min. In order to collect data for the storage modulus G', the starch suspension has to form a paste. The final holding temperature therefore needs to equal or exceed the gelatinization temperature, which corresponds to 65° C., 70° C., 60° C. and 65° C. for WMS, NMS, WRS and NRS respectively. During heating, the sample is mixed by a paddle at 16.75 rad/s.

Linear Viscoelastic Properties

Small Amplitude Oscillatory Shear (SAOS) experiments were employed to determine the frequency-dependent storage modulus (G') and loss modulus (G") of the starch suspension in the linear response regime. The starch paste described in the previous section was transferred to the 40 mm parallel plate on DHR3 rheometer (TA instruments) with a 1 mm measuring gap. The paste was subjected to oscillatory strain with amplitude 0.01 strain at 40° C. A frequency sweep was performed from 0.01 to 10 Hz. All measurements were made in triplicate.

Yield Stress and Apparent Viscosity

The starch sample was loaded into the gap between two parallel plates in DHR-3 rheometer as described above. The instrument was operated at constant stress mode. Under the constant stress mode, the apparent viscosity of the sample was measured for different values of shear stress. The yield stress was obtained as the stress corresponding to the asymptote where the apparent viscosity appears to diverge. Using same a similar procedure, the rheometer was also operated at a constant shear rate (in the range of 0.1 to 10 s-1) to obtain the apparent viscosity vs shear rate. All measurements were made in triplicate.

Peak Force (Hardness of Granule)

The hardness of starch granules was measured on the DHR3 Rheometer equipped with a 40 mm Peltier plate cartridge immediately after pasting. The starting gap was 1 mm, which ensured that the force at the beginning of measurement is negligible. The sample was trimmed to fit right at the edge of the plate. The sample was first subject to a shear rate at 5 s-1 for 30 s and then was equilibrated for 60 s in order to homogenize the sample. The upper plate was then lowered at 5 µm/s speed to reach the final gap of 10 µm (for rice starch) and 15 µm (for maize starch). This gap size was chosen such that it is less than the average granule size after pasting (pasting temperature 65° C. for 5 min), thus one layer of starch granule can fit under the gap. During compression, the force is measured, and the peak value (i.e., peak force) is extracted, which is directly related to the hardness of a single layer of starch granules. Measurements of peak force are done at 40° C.

Particle Size Distribution and Calculation of Volume Fraction $\phi$

A suspension of 2 g of starch paste in DI water was analyzed by static light scattering with a Malvern Mastersizer 2000. The refractive index of starch and water are 1.53 and 1.33, respectively. The bulk density of starch was measured by the Tapped Density Tester (Agilent Technologies).

The distribution of granule volumes is broken into M bins, with the average granule volume of bin i denoted as $\bar{v}_i$. The average volume of starch granules $\bar{V}(t)$ different times is given by:

$$\bar{V}(t) = \Sigma_i \bar{v}_i f(N_i) \tag{1}$$

where $f(N_i)$ is the number fraction of granules in the $i^{th}$ bin, which is related to volume fraction $f_v(v_i)$ and average granule volume $\bar{v}_i$ in the bin via $$f(N_i) = \frac{f_v(v_i)/\bar{v}_i}{\Sigma_i f_v(v_i)/\bar{v}_i} \tag{2}$$

Based on mass balance of starch inside the granule, the volume fraction $\phi(t)$ of swollen granule at time t is given by, $$\phi(t) = \phi_0 \frac{\bar{V}(t)}{\bar{V}_0} \tag{3}$$

In the above equation, $\bar{V}_0$ is the initial average volume of starch granules, $\phi_0$ is the initial volume fraction which is evaluated using $$\phi_0 = \frac{w\rho}{\rho_{granule}} \tag{4}$$

where W is the weight fraction of starch suspension $\rho_{granule}$, the density of granule immersed in water, is given by $$\rho_{granule} = \varepsilon\rho_\omega + (1-\varepsilon)\rho_{starch} \tag{5}$$

where $\varepsilon$, the void fraction of the granule, is obtained from $$\varepsilon = 1 - \frac{\rho_{gr,air}}{\rho_{starch}} \tag{6}$$

and $\rho_{gr,air}$, the density of granule in air is equal to $$\frac{\rho_{bulk}}{\phi_{cp}},$$

$\rho_{bulk}$ and $\phi_{cp}$ being the bulk density of starch granules and close packed volume fraction of granules respectively. The bulk density of the granules is measured by filling them in a tube and tapping the tube to obtain a randomly close packed arrangement of particles. The bulk density $\rho_{bulk}$ of WMS, NMS, WRS and NRS are 0.6909. 0.7525, 0.515 and 0.5017 g/mL, respectively. The random closed packed volume fraction of the granules was obtained by fitting the number density of granule size distribution to log normal distribution and using the following correlation that was obtained by Desmond and Week (Desmond and Weeks 2014) as given by $$\phi_{rcp} = 0.634 + 0.0658\delta + 0.0857\gamma\delta^2 \tag{7}$$

where $$\gamma = (e^{\sigma^2} + 2)\sqrt{e^{\sigma^2} - 1} \tag{8}$$

and $$\delta = \sqrt{e^{\sigma^2} - 1} \tag{9}$$

In the above equations, $\sigma$ is the standard deviation. In eq. (4), $\rho$, the density of starch suspension is given by, $$\rho = \frac{1}{\frac{1-w}{\rho_\omega} + \frac{w}{\rho_{starch}}} \tag{10}$$

Physical Characterization of Starch

Differential scanning calorimetry and static light scattering were employed to obtain the gelatinization temperature, enthalpy of gelatinization, and second virial coefficient respectively using methods described in our earlier publications (Desam, Li et al. 2018a, Desam, Li et al. 2018b).

Interfacial Free Energy of Starch Granule:

The Owen, Wendt, Rabel and Kaelble (OWRK) model was employed to infer the interfacial free energy of starch granules and water (Owens and Wendt 1969). Contact angle measurements of starch paste were made for two liquids, (i) water (polar) and (ii) diiodomethane (dispersive). Biolin Scientific's Theta tensiometer equipped with One Attention software was used to measure contact angle. Starch paste sample was evenly spread on a piece of glass slide to ensure there was no bubbles or lumps. The slide then was air-dried for two hours to ensure that no wet spot was left. During the contact angle measurement for water and diiodomethane, a droplet size of 2 µL was placed at a speed of 0.5 µL/s onto the glass slide.

By assuming $$\gamma_{sl} = \gamma_{sv} + \gamma_{lv} - 2\sqrt{\gamma_{sv}^d \gamma_{lv}^d} - 2\sqrt{\gamma_{sv}^p \gamma_{lv}^p} \tag{11}$$

where $\gamma_{ij}$ refers to the interfacial energy between phases i and j, and superscripts d and p refer to the dispersive and polar components of the interfacial energy, the following expression for the contact angle $\theta$ can be obtained by employing Young's equation $$\gamma_{lv}(1 + \cos\theta) = 2\sqrt{\gamma_{sv}^d \gamma_{lv}^d} + 2\sqrt{\gamma_{sv}^p \gamma_{lv}^p} \tag{12}$$

The surface tension of liquid is the sum of polar and nonpolar contributions, i.e.

$$\gamma_{lv} = \gamma_{lv}^d + \gamma_{lv}^p \tag{13}$$

The value of $\gamma_{lv}^p$ can be evaluated from the knowledge of $\gamma_{lv}$ and $\gamma_{lv}^d$. The measurement of contact angle for two liquids against the starch paste surface can be used to obtain $\gamma_{sv}^d$ and $\gamma_{sv}^p$ by using eq. (12) for the two liquids.

Figure 11:
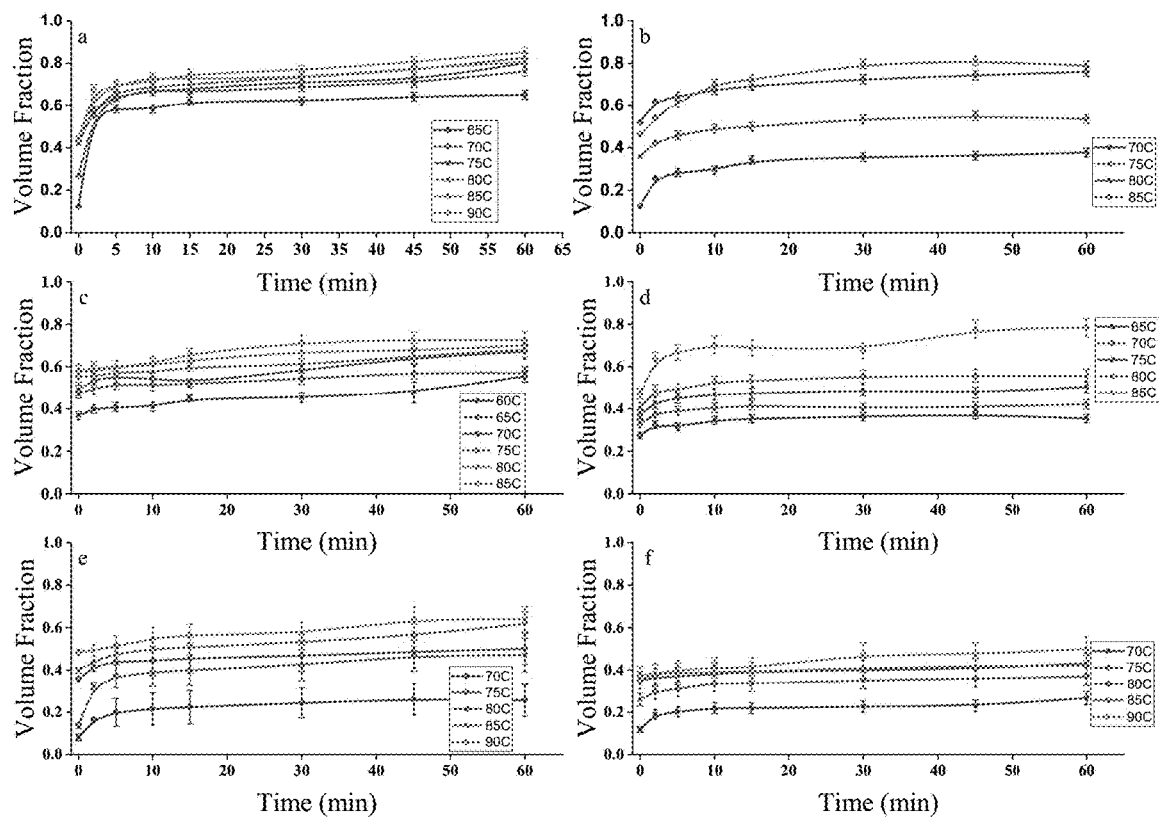
FIG. 11 Starch granule volume fraction vs time (a) WMS (b) NMS (c) WRS (d) NRS (e) Cross link 1 of NMS (f) Cross link 2 of NMS FIG. 12 G' vs frequency for WMS at different holding temperatures for hold times of (a) 5 min (b) 15 min and (c) 60 min FIG. 13 G" vs frequency for WMS at different holding temperatures for hold times of (a) 5 min (b) 15 min and (c) 60 min FIG. 14 G' vs volume fraction for 8% w/w suspension of (a), WMS, (b) NMS, (c) WRS and (d) NRS (e) Cross link 1 of NMS (f) Cross link 2 of NMS at 4 Hz oscillatory frequency when heated to different temperatures.

Results:

Swelling:

When heated to different temperatures, the size distribution of starch granules shift to larger sizes over time due to swelling as reported in our previous papers (Desam, Li et al. 2018a, Desam, Li et al. 2018b). The granule volume fraction vs time is shown in FIG. 11 panels a-f for all starch samples at different holding temperatures. A rapid increase in the starch volume fraction was observed in the first two minutes of heating at all temperatures, followed by a slower increase in the volume fraction over a longer time period (30-45 min). Some samples reached equilibrium at 45 min. The volume fraction of starch granules increases with holding temperature.

Note: in the case of normal maize starch (NMS) heated to 90° C., the granule volume fraction calculated from the number density decreased with time because of granule breakup (data not shown). Described herein is starch rheology before granule breakup occurs.

Linear Viscoelasticity

Figure 12:
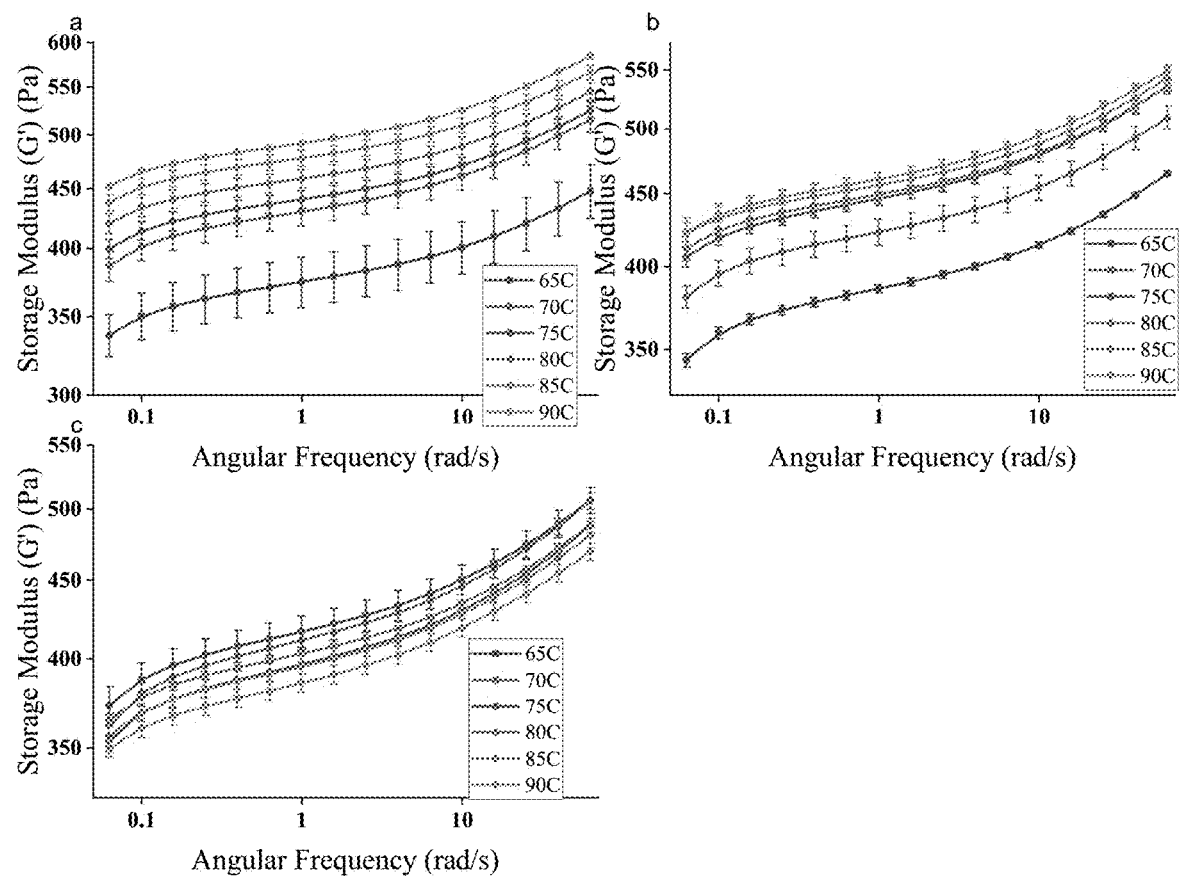
Figure 13:
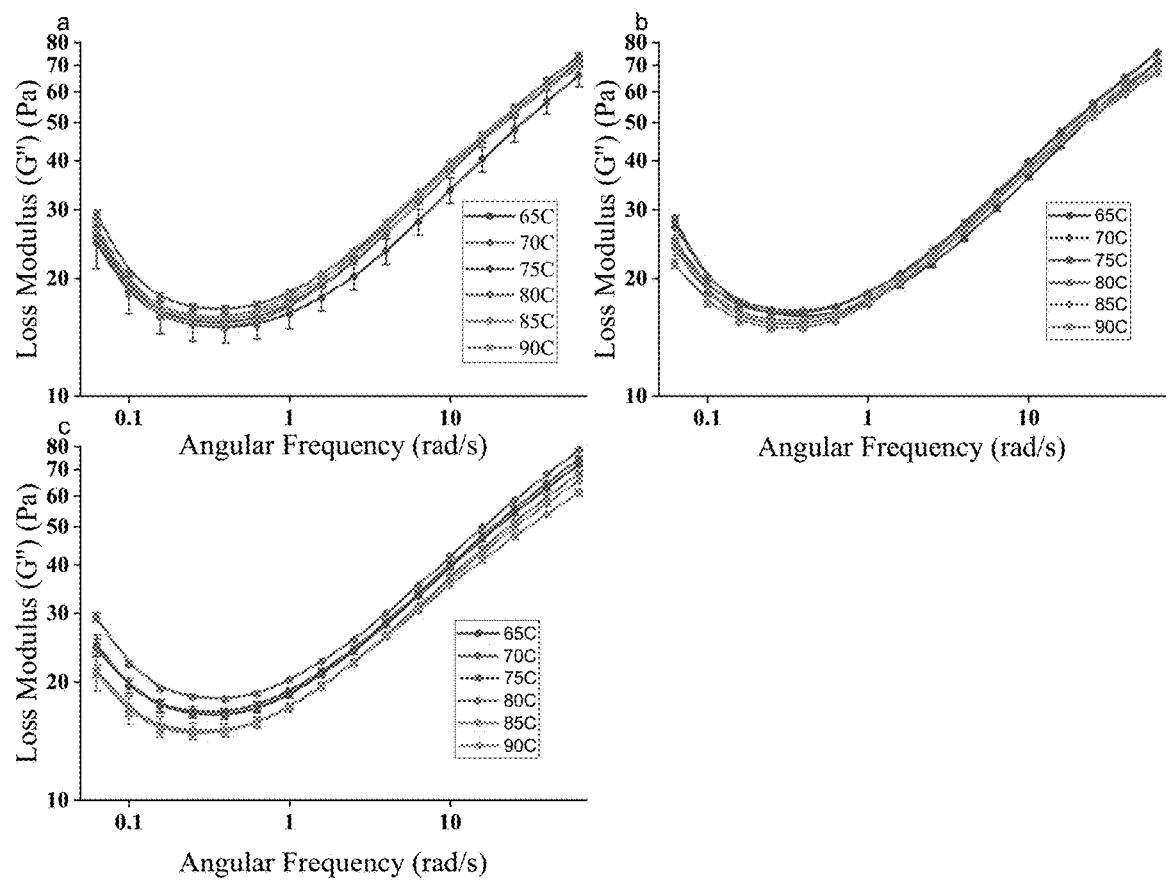

The storage modulus G' is much greater than the loss modulus G" indicating that that the elastic component of starch paste dominates the viscous component. FIGS. 12 and 13 report G' vs frequency (in the range of 0.05 to 10 Hz) and G" vs frequency for waxy maize starch at different temperatures and holding times. The effect of heating temperature on G' is most significant at small holding times (5 min, see FIG. 12 panel a). At larger holding times (60 min, see FIG. 12, panel c), the effect of temperature becomes less significant and one does not observe a definite trend for how G' varies with temperature. Similar plots for other starches are obtained (data not shown). Unlike G', the hold time and temperature have negligible effect on G" (FIG. 13). The loss modulus G" exhibits a shallow minimum at frequencies $\omega \sim 0.1$-$1$ s$^{-1}$.

Figure 14:
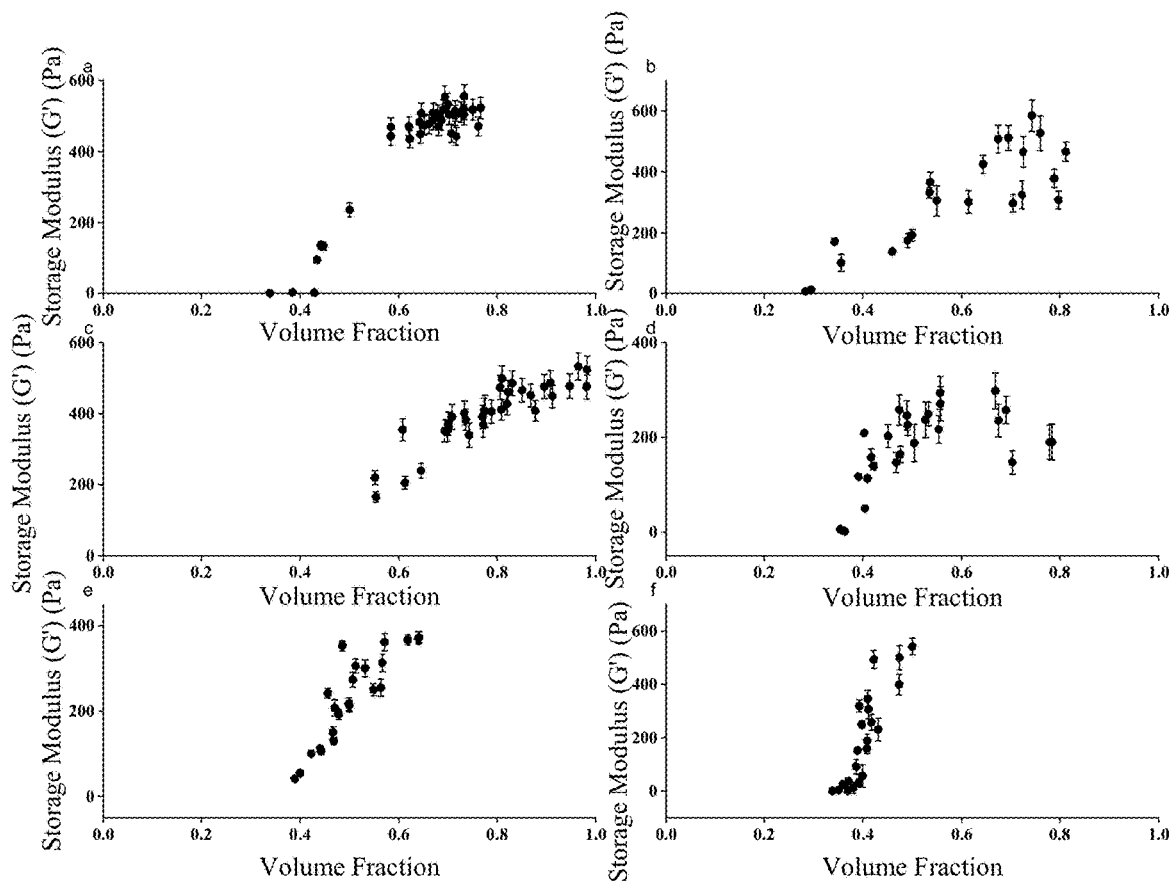

The variation of G' with volume fraction is shown in FIG. 14 for different heating times and temperatures. G' increases monotonically with volume fraction for waxy maize (WMS), cross-linked maize (Xlink MS), and waxy rice (WRS) starches, whereas G' exhibits a maximum at an intermediate volume fraction for normal maize (NMS) and normal rice (NRS) starches. Such a behavior may be due to competing effects of swelling and softening of starch granules upon heating. Swelling results in crowding of granules in the suspension as a result of an increase in granule volume fraction as discussed above. This results in an increase in G' at short times. At longer times, however, the starch granule becomes softer thereby facilitating its deformation. This effect is more pronounced at higher temperatures and depends on the composition of the starch granule. Higher deformability enables the granules to pack more efficiently when subject to shear thereby reducing G'. Thus, the storage modulus G' can decrease at longer holding times, especially at higher heating temperatures. Note: normal starches are generally softer than waxy or cross-linked starches, and hence will likely experience such effects of granule softening.

Figure 15:
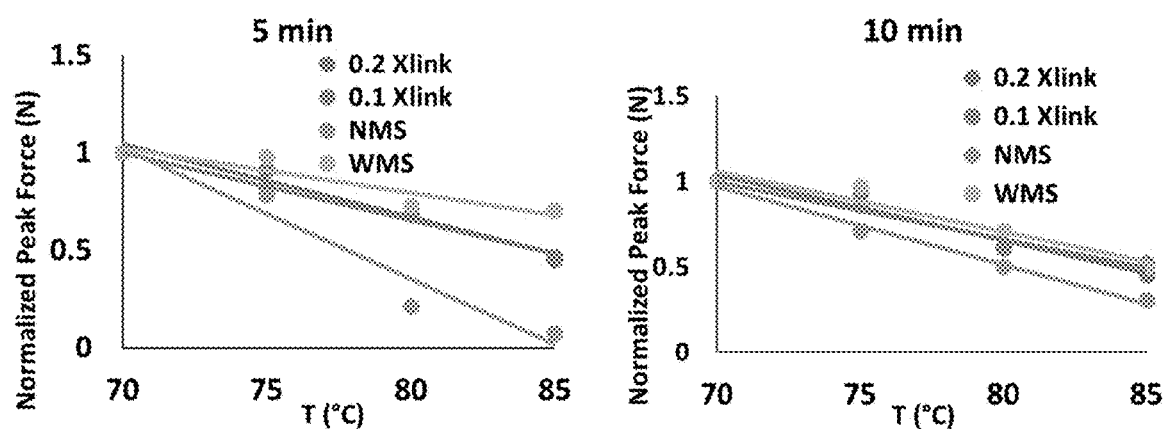
FIG. 15 Peak force measures the hardness of granules of (a) WMS (b) NMS (c) WRS (d) NRS (e) Cross link 1 of NMS (f) Cross link 2 of NMS. As heating continues, the granules become softer and exhibit a smaller peak force.

Force measurements were performed to obtain qualitative comparisons of starch granule hardness. Such measurements show that as temperature increases, the granule swells more, becomes less rigid, and exhibits a lower peak force during indentation (FIG. 15). The decrease in peak force with temperature is more pronounced for NMS compared to WMS and cross linked starch (FIG. 15).

Nonlinear Rheology (Yield Stress)

Figure 16:
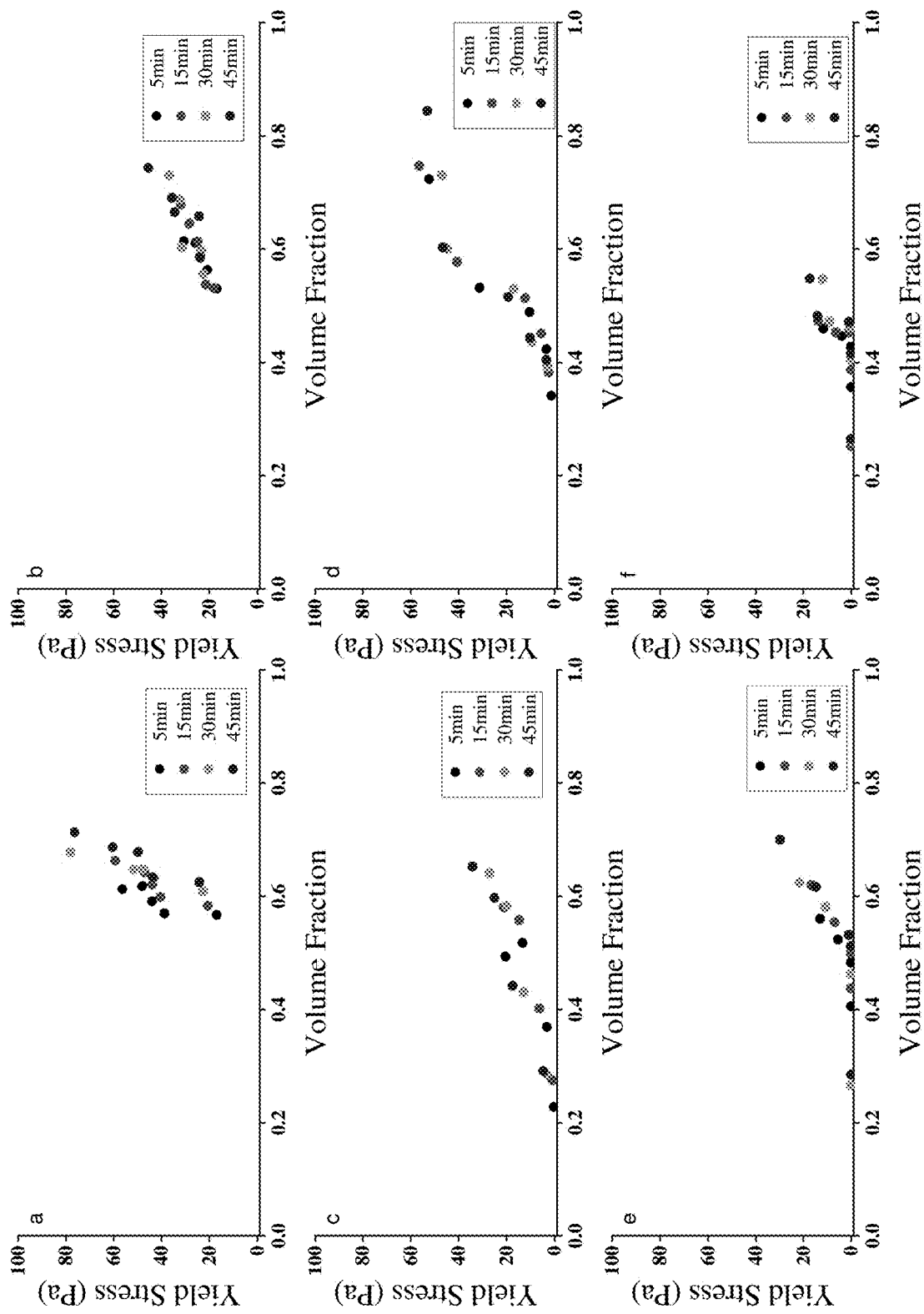
FIG. 16 Yield stress vs granule volume fraction for (a) WMS (b) NMS (c) WRS (d) NRS (e) Cross link 1 of NMS (f) Cross link 2 of NMS FIG. 17(a) Storage modulus vs volume fraction for WMS, NMS, WRS and NRS heated at times 5, 10, 15, 30, 45 and 60 min at holding temperatures of 60° C. (only for WRS), 65° C. (not for NMS), 70° C., 75° C., 80° C., 85° C. and 90° C. (not for NMS); (b) without experimental data points for 80° C. and above for NMS and 85° C. and above for NRS. These removed points correspond to when the granule significantly softens and hence exhibits a non-monotonic dependence of storage modulus vs. volume fraction.

The starch suspensions were found to exhibit a yield stress. The variation of yield stress is shown in FIG. 16 for different heating temperatures, holding times, and starch varieties. The yield stress is found to increase with holding temperature and holding time, with this increase being more pronounced at lower temperatures. The yield stress is also plotted in FIG. 16 as a function of volume fraction of the starch suspension. Surprisingly, the yield stress vs volume fraction falls into a single curve for different heating times and temperatures. The values of yield stress for different systems are given in Table 3. The yield stress is the lowest for normal maize (varying from 0 to 40 Pa) and highest for waxy maize (from 10 to 80 Pa). In addition, the rate of increase of yield stress with volume fraction was highest for waxy maize and lowest for normal maize. The yield stresses of cross linked starches were found to be similar to waxy maize as can be seen from the superposition of yield stress data for the three systems.

TABLE 3

Yield stress of starch paste at fixed time and temperature

| | Time (min) | 70° C. | 75° C. | 80° C. | 85° C. | 90° C. |
|---|---|---|---|---|---|---|
| WMS | 5 | 16.9073 | 38.7784 | 43.9202 | 47.9548 | 56.3045 |
| | 15 | 20.6285 | 40.4258 | 43.7776 | 47.0241 | 59.2806 |
| | 30 | 22.6263 | 43.0776 | 47.7057 | 51.4916 | 78.0865 |
| | 45 | 24.1015 | 43.5813 | 49.7124 | 60.4 | 76.3126 |
| NMS | 5 | 0.366183 | 3.19375 | 13.2948 | 20.4167 | 43.7039 |
| | 15 | 0.906123 | 6.28951 | 14.7452 | 21.2528 | 53.739 |
| | 30 | 3.27312 | 12.9058 | 19.999 | 27.0119 | 62.1232 |
| | 45 | 4.613146 | 17.48032 | 25.024 | 34.2429 | 55.876 |
| WRS | 5 | 16.9073 | 20.8315 | 23.8219 | 25.7577 | 30.6831 |
| | 15 | 18.1319 | 21.379 | 24.8015 | 28.3986 | 31.9162 |
| | 30 | 22.4537 | 23.3712 | 31.4129 | 32.3959 | 36.7055 |
| | 45 | 23.9293 | 24.2485 | 34.5518 | 35.614 | 45.457 |
| NRS | 5 | 1.32422 | 3.38899 | 10.441 | 31.2104 | 52.3614 |
| | 15 | 2.46841 | 5.5333 | 12.2661 | 40.6682 | 56.4874 |
| | 30 | 2.99662 | 9.65774 | 16.9384 | 44.6744 | 47.152 |
| | 45 | 3.37897 | 10.261 | 19.3575 | 46.6605 | 53.1395 |
| 0.1% Xlink | 5 | N/A | 0.109 | 0.1682 | 5.4874 | 13.0092 |
| | 15 | N/A | 0.07716 | 0.1888 | 7.00227 | 16.5192 |
| | 30 | 0.00437 | 0.0754 | 0.3101 | 10.6389 | 21.619 |
| | 45 | 0.02069 | 0.08109 | 0.9367 | 14.7737 | 30.0162 |
| 0.2% Xlink | 5 | N/A | 0.07716 | 0.1888 | 4.00227 | 11.5192 |
| | 15 | 0.01124 | 0.0712 | 0.87949 | 6.4355 | 13.8961 |
| | 30 | 0.01148 | 0.080189 | 0.25607 | 9.1464 | 12.0739 |
| | 45 | 0.0361 | 0.0965 | 0.9855 | 14.0606 | 17.2898 |

Prediction of Limiting Value of G' for Concentrated Starch Suspensions

When the volume fraction of swollen granules becomes greater than $\phi=0.65$, i.e., the close-packed volume fraction of randomly-placed spheres, the granules deform and form a tightly-packed microstructure. At sufficiently high particle volume fractions, the suspension exhibits a foam-like structure with thin films and interconnected Plateau borders (Narsimhan and Ruckenstein 1986a). A dodecahedral structure separated by thin films of aqueous phase is assumed. Three such films intersect at the dihedral angles of 120° in a channel called Plateau border. Four and only four these edges meet at a point at the angles of $\alpha$ (109° 28'16", the tetrahedral angles) to satisfy the laws of Plateau. In the limit of high particle volume fraction, the diameter of the flat surface separating neighboring particles is determined by foam geometry (Narsimhan and Ruckenstein 1986a). It has been shown (Johnson, Kendall et al. 1971) that the under small loadings, the compressive force between neighboring particles depends on the surface energy between the particles and the solvent, rather than the bulk elasticity of the material (e.g., Hertzian contact mechanics). For interaction between two particles of radii $R_1$ and $R_2$, the compressive force F is given by $$F = \frac{\gamma \pi R_1 R_2}{R_1 + R_2} \quad (14)$$

where $\gamma$ is the interfacial energy between the starch granules and solvent, which can be experimentally obtained using methods described previously.

The dispersion is considered as consisting of particles at the average granule size. As noted above, the deformed granule dispersion exhibits a dodecahedral foam structure. From geometry, the radius $R_f$ of the film separating two neighboring particles is $0.808\bar{R}$, where $\bar{R}$ is the average granule radius. Each particle is surrounded by $n_f=12$ neighboring particles. Therefore, on average, the number of films per particle is equal to $n_f/2=6$ to avoid double counting. The distance $\chi$ between two neighboring particles is given by, $$\chi = 2(\bar{R}^2 - R_f^2)^{1/2} \quad (15)$$

Recognizing that the adhesion energy U between two granules is given by $$U = -\frac{n_f}{2} \pi R_f^2 \gamma \quad (16)$$

the compressive force F between the two granules is now given by, $$F = -\frac{dU}{dx} = -\frac{dU}{dR_f^2}\frac{dR_f^2}{dx} = -2 n_f \pi \gamma (\bar{R}^2 - R_f^2)^{1/2} \quad (17)$$

Recognizing that the compressive pressure $P = 2F/(\pi n_f R_f^2)$, one obtains $$P = \frac{4\gamma(\bar{R}^2 - R_f^2)^{\frac{1}{2}}}{R_f^2} = \frac{4\alpha\gamma}{\bar{R}} \quad (18)$$

Where the constant $\alpha=0.902$.

At low strains, the starch paste (suspension of swollen granule) is elastic—i.e. the applied stress is proportional to strain with a storage modulus that is dependent on the volume fraction. Above a yield stress, the paste begins to flow and exhibits shear thinning. In the current investigation, the linear elastic behavior of the starch suspension is of interest. As stated before, the solid foam structure of high volume fraction suspension of swollen granules can be pictured as isotropic network of elastic interconnected surfaces with interfacial free energy $\gamma$ that are separated by thin aqueous films. To evaluate the bulk Young's modulus of such a network, the stress of the network when it is subject to a uniaxial strain is evaluated. Since the suspension is incompressible, the limiting value of shear modulus for the high volume fraction suspension is one third of Young modulus and is related to compressive pressure of the suspension via $$G'_0 = \frac{1}{4}P = \frac{\alpha\gamma}{\bar{R}} \quad (19)$$

The details of this calculation are given by Stamenovic (Stamenovic 1991).

One can use eq (19) to estimate the limiting values of elasticity $G_0'$ for many different starch varieties. The interfacial energy $\gamma$ is obtained from experimental measurements of contact angle (Table 4). The equilibrium number fraction is obtained using a kinetic model for swelling developed in our previous publication (Desam, Li et al. 2018a) This model allows one to infer the equilibrium size distribution of starch granules given the heating rate, holding time, starch composition, and initial size distribution. Table 4 gives the estimated limiting values of elasticity $G_0'$ for WMS, WRS, cross link1, and cross link2 starches for different holding temperatures as evaluated from eq. (19).

TABLE 4

Interfacial energy and Limiting Storage Modulus between starch paste and water

| | condition | $\gamma_{ts}$ (mN/m) | Std. dev (mN/m) | $G'_0$ (Pa) |
|---|---|---|---|---|
| NRS | 90° C., 15 min | 6.98 | 0.45 | 632.256 |
| WRS | 90° C., 60 min | 4.36 | 0.68 | 585.584 |
| NMS | 85° C., 30 min | 14.6 | 1.50 | 708.633 |
| WMS | 90° C., 60 min | 11.31 | 1.81 | 687.048 |
| 0.1% NMS | 90° C., 60 min | 7.25 | 0.77 | 659.4686 |
| 0.2% NMS | 90° C., 60 min | 8.32 | 0.37 | 981.443 |

Master Curve of G' Vs Volume Fraction

Figure 17:
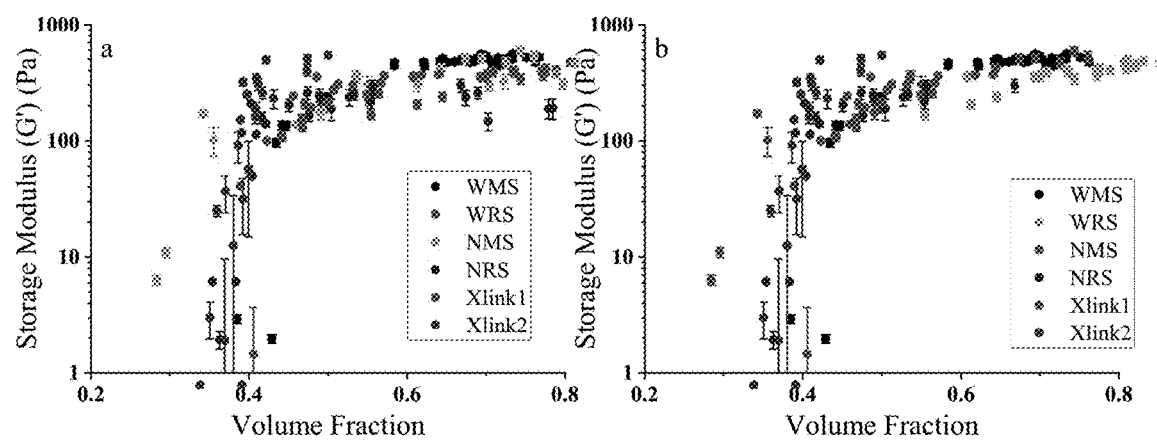
Figure 18:
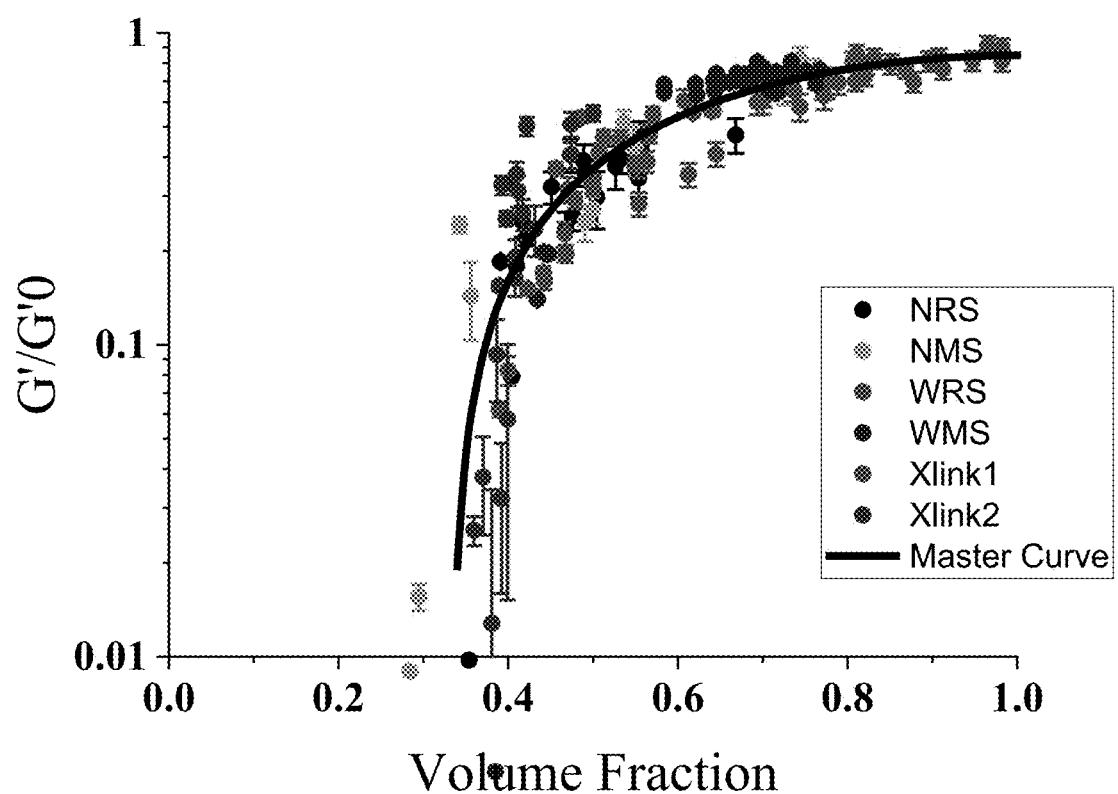
FIG. 18 Normalized G' vs granule volume fractions

FIG. 17 panel a combines all the experimental data for the storage modulus G' vs volume fraction $\phi$ for different starch types, holding temperatures, and holding times. It is surprising to note that the data points appear to fall into a single curve, although at higher volume fractions, some data sets do not monotonically increase but decrease after reaching a maximum value. As pointed out before, G' tends to increase with $\phi$ and plateaus to a constant value, but for some starches the trend is non-monotonic due to granule softening as evidenced by peak force measurements (see FIGS. 14 and 15). These non-monotonic data sets are removed in the subsequent development of a master plot and are shown in FIG. 17 panel b. In this case, the granules exhibit negligible softening and hence the storage modulus of the paste is dependent mainly on the packing of the granules and hence the volume fraction. As pointed out above, however, the limiting value of elasticity $G_0'$ is different for different starch types and for different holding temperatures. One needs to normalize the elasticity with this limiting value in order to obtain the master curve. In other words, one needs to plot $G'/G_0'$ vs $\phi$ to get the master curve. Such a plot is shown in FIG. 18. G' is negligible up to volume fraction of $\phi \approx 0.4$, increasing dramatically up to close packed volume fraction of $\phi \approx 0.65$ and levelling off at higher volume fractions. The best fit of the master curve is also shown in FIG. 18.

Figure 19:
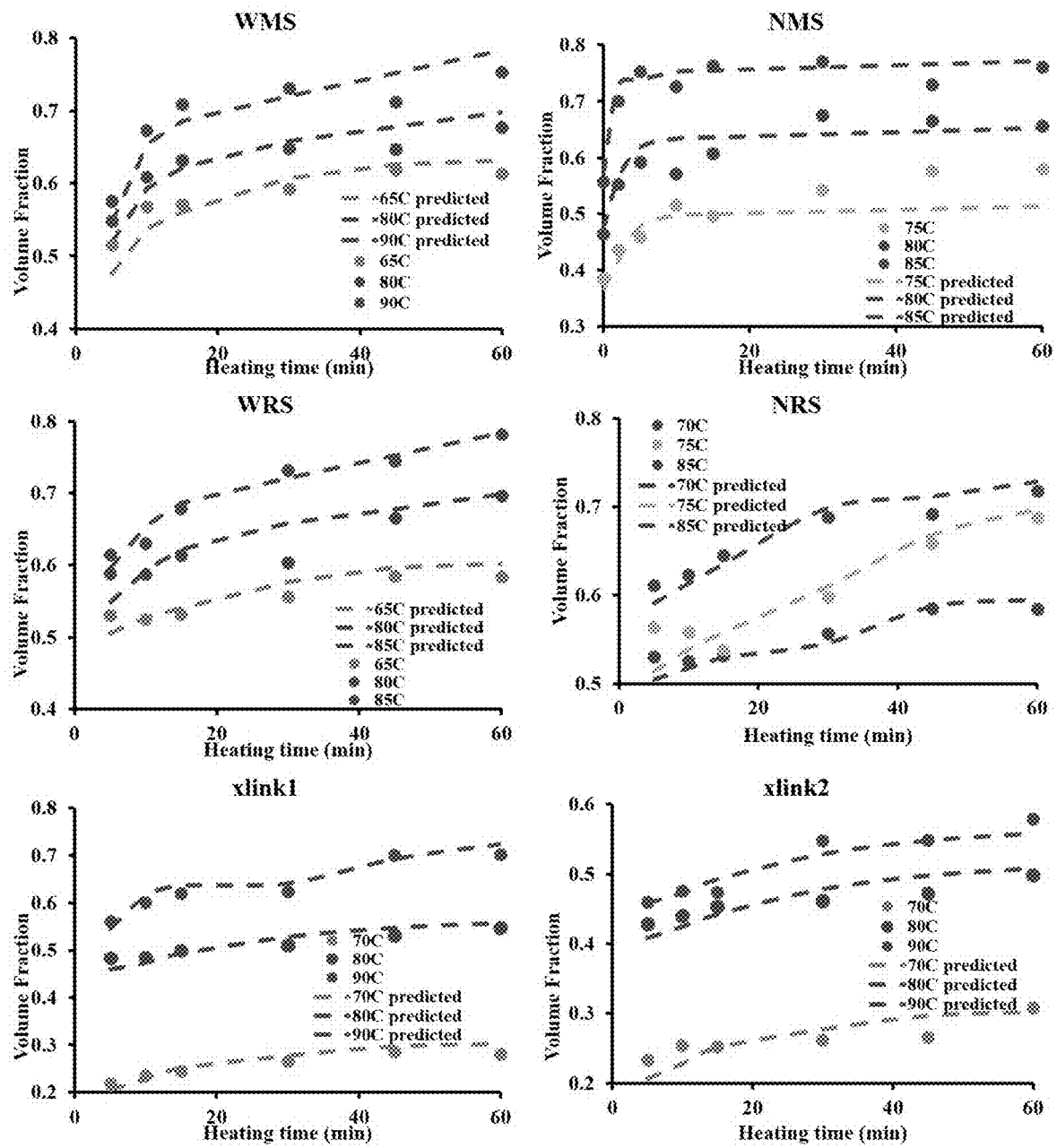
FIG. 19 Comparison of experimental granule fraction vs time with predictions using mechanistic model (a) WMS (b) NMS (c) WRS (d) NRS (e) Cross link 1 of NMS (f) Cross link 2 of NMS FIG. 20 Comparison of experimental G' vs time at different holding temperatures with predictions using mechanistic model and master curve (a) WMS (b) NMS (c) WRS (d) NRS (e) Cross link 1 of NMS (f) Cross link 2 of NMS FIG. 21 Experimental vs predicted G' for all starch types under different holding temperatures and time FIG. 22 Comparison of experimental with predicted G' for NRS for three different heating profiles. The heating profiles are given in the insets.

Comparison of Experimental Results with Predictions:

The kinetic model of starch swelling described herein is used to predict the evolution of granule size distribution and therefore starch granule volume fraction for all starch samples at different holding temperatures and times. The details of the mechanistic model are given in our earlier publication (Desam, Li et al. 2018a). Briefly, the model expresses the diffusion of water into the granule arising from a chemical potential gradient. The chemical potential of water inside the granule is expressed in terms of the volume fraction of starch inside the granule via Flory-Huggins polymer solution thermodynamics. In the Flory-Huggins theory, one needs to obtain measurements for the Flory Huggins $\chi$ parameter and the cross-link density of the granule network. One extracts $\chi$ at room temperature from a Berry plot using static light scattering, which allows one to estimate a second virial coefficient. The variation of $\chi$ with temperature above the gelatinization temperature $T_g$ is then described in terms of enthalpy of gelatinization $\Delta H$ as follows:

$$\chi(T) = \chi(T_{room}) + \frac{\Delta H}{RT_g}\left(1 - \frac{T_g}{T}\right),$$

where R is the natural gas constant. The gelatinization temperature and enthalpy of gelatinization were obtained from DSC measurements as described. The number of cross links of starch network inside the granule is estimated from the equilibrium swelling at different temperatures. The physical parameters for different starch varieties that are employed in the model are given in Table 5. This swelling model, combined with a population balance analysis, allows one to predict the granule size distribution, and hence volume fraction, as a function of time (Desam, Li et al. 2018a). The predicted evolution of starch granule volume fraction compares well with the experimental values for different starch types as shown in FIG. 19 panels a-f

TABLE 5

Model parameters

| Type of Starch | Gelatinization $T_g$ (K) | Mw (g/mole) | $\Delta H$ (J/mol) | $\chi$ | $v^*$ |
|---|---|---|---|---|---|
| WMS | 337.8 | 2430000 | 145900 | 0.5 | 0.004 |
| NMS | 341.15 | 1950000 | 66885 | 0.5 | 0.0063 |
| Xlink1 | 341.2 | 2030000 | 109538 | 0.5 | 0.0198 |
| Xlink2 | 341.9 | 2237000 | 168893 | 0.5 | 0.079 |
| WRS | 331.86 | 1609300 | 298425 | 0.5 | 0.0388 |
| NRS | 336.24 | 1516000 | 134521 | 0.5 | 0.0298 |

Figure 20:
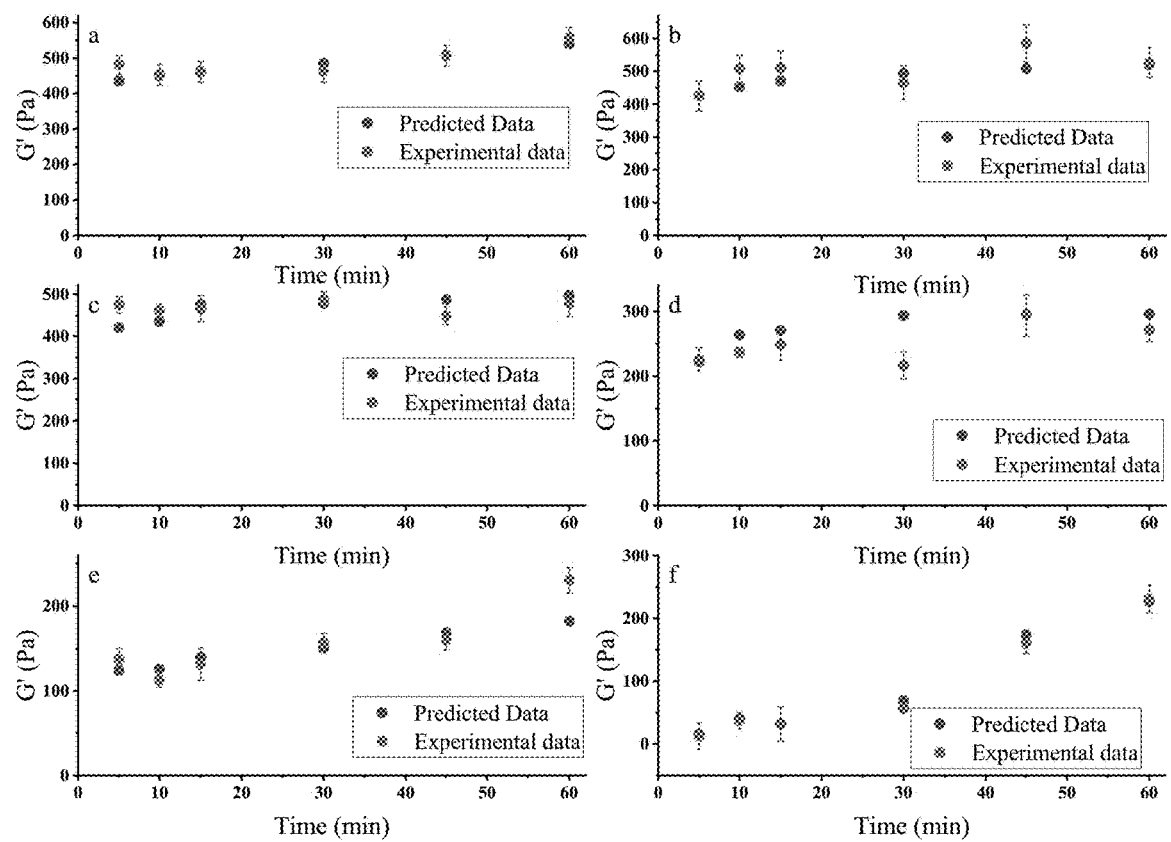
Figure 21:
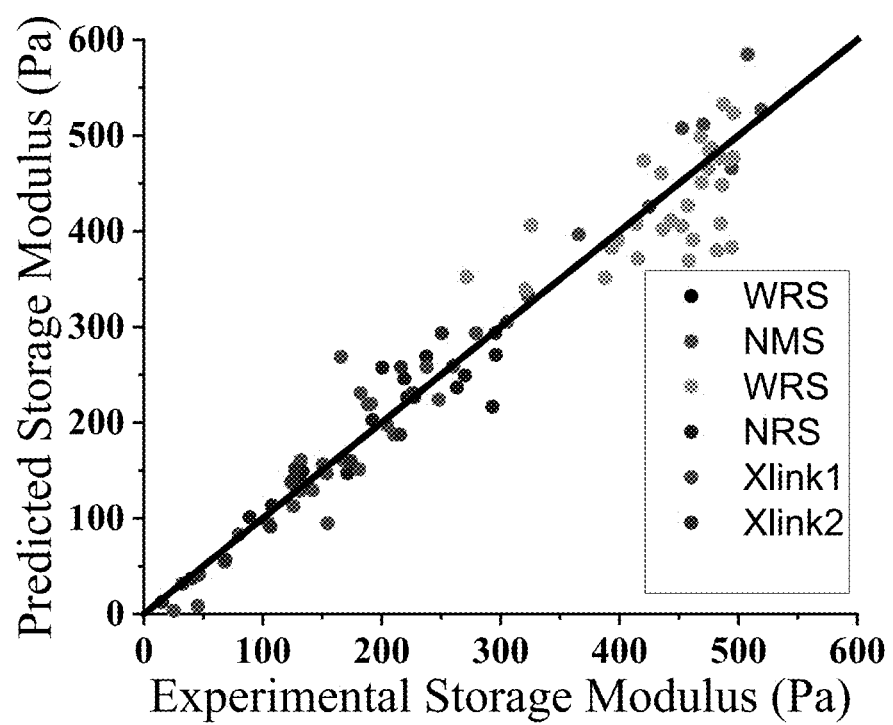
Figure 22:
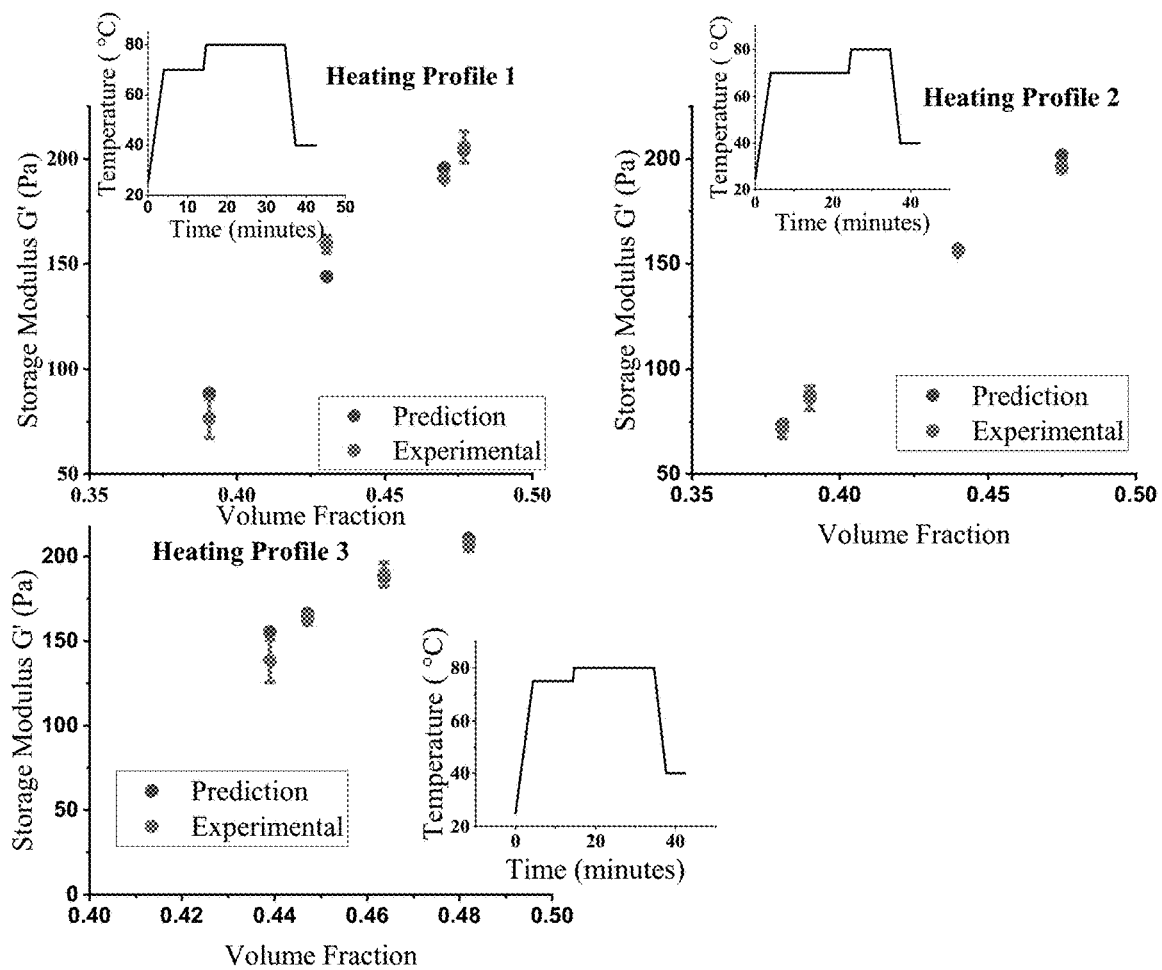
Figure 23:
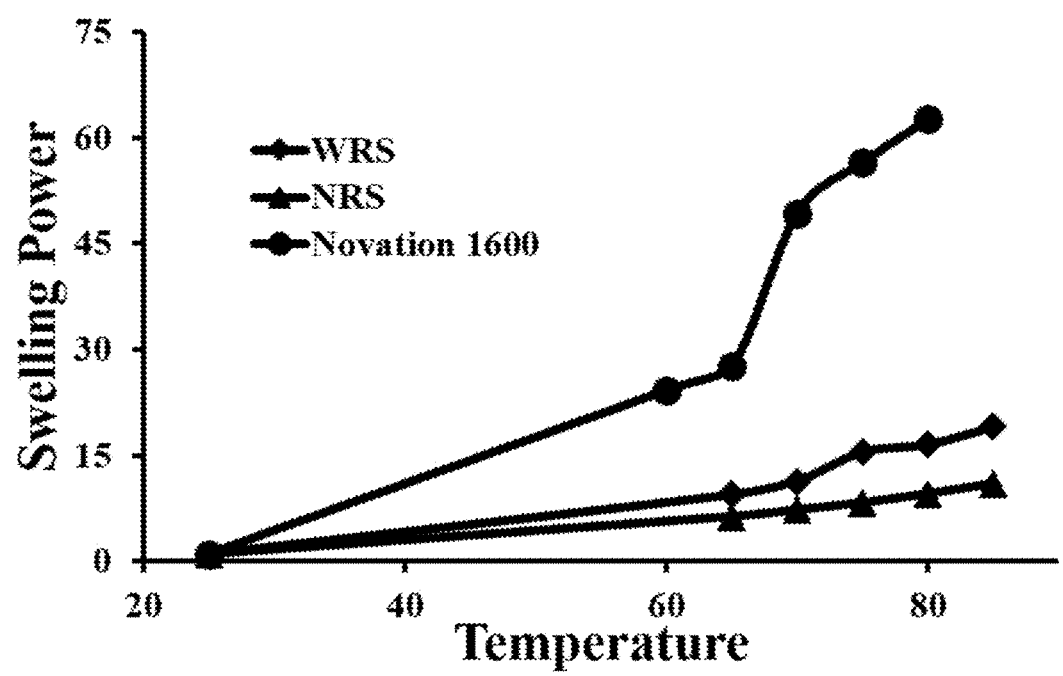
FIG. 23 Swelling power vs temperature for different starches Points—experimental data; solid lines—mechanistic model predictions.
Figure 24:
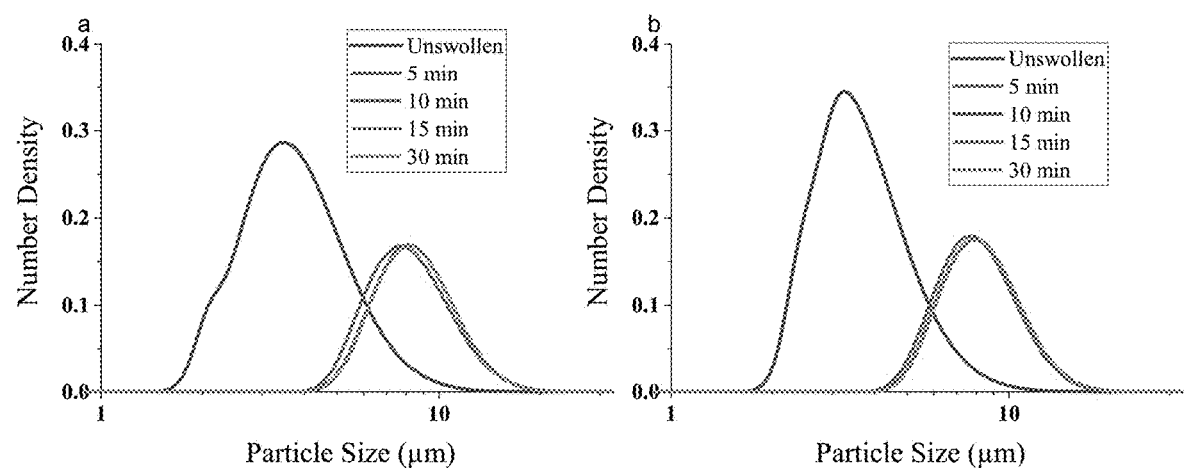
FIG. 24 Starch granule number density at different times for (a) pudding and (b) soup for a heating profile 1 (80° C., as shown in FIGS. 25a and 26a).
Figure 25:
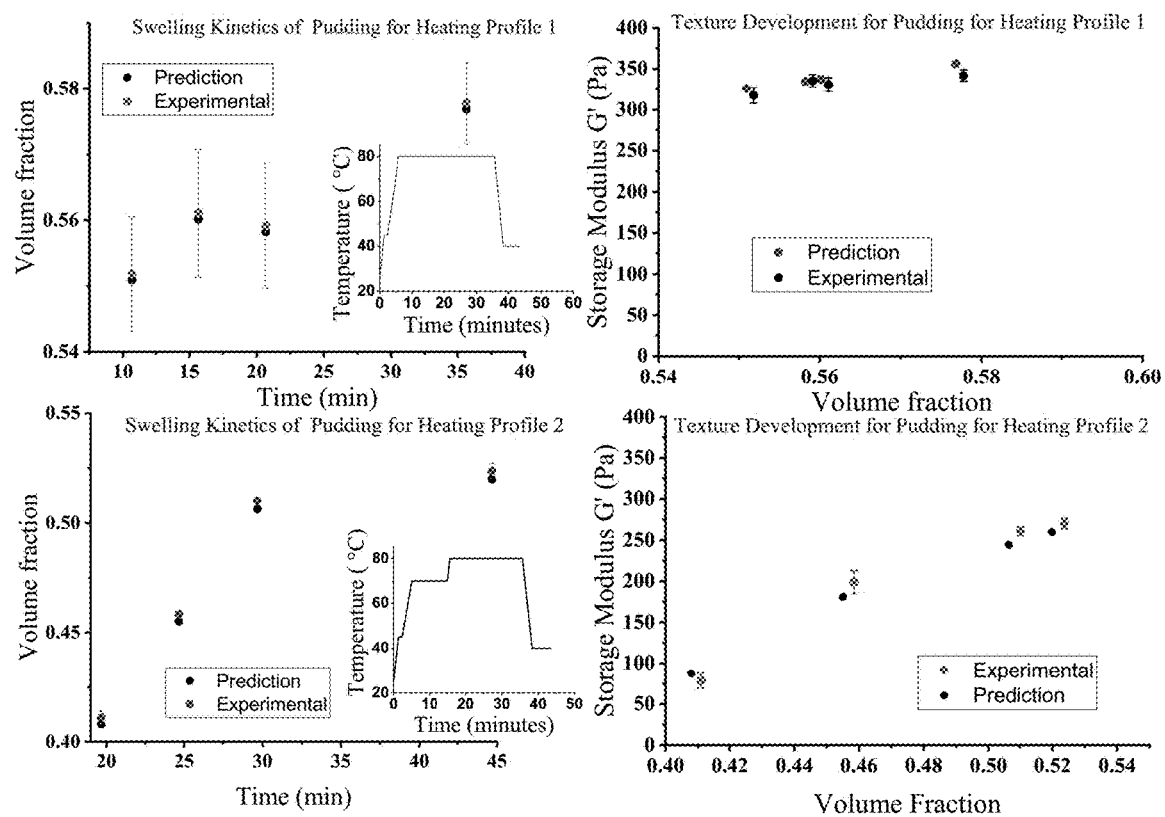
FIG. 25(a) Comparison of experimental and predicted starch volume fractions for pudding for heating profile 1 that is shown in the inset (b) Comparison of experimental and predicted texture (G') for pudding for heating profile 1 (c) Comparison of experimental and predicted starch volume fractions for pudding for heating profile 2 that is shown in the inset (d) Comparison of experimental and predicted texture (G') for pudding for heating profile 2
Figure 26:
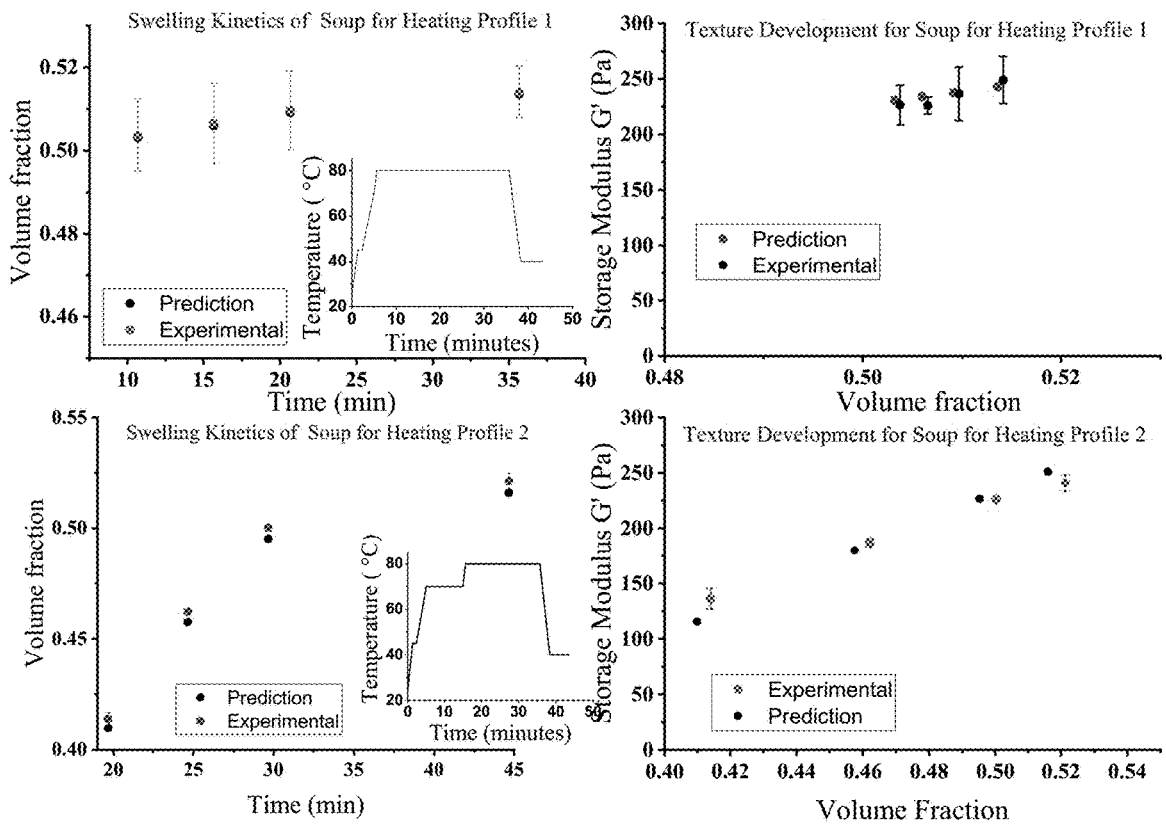
FIG. 26(a) Comparison of experimental and predicted starch volume fractions for soup for heating profile 1 that is shown in the inset (b) Comparison of experimental and predicted texture (G') for soup for heating profile 1 (c) Comparison of experimental and predicted starch volume fractions for soup for heating profile 2 that is shown in the inset (d) Comparison of experimental and predicted texture (G') for soup for heating profile 2
Figure 27:
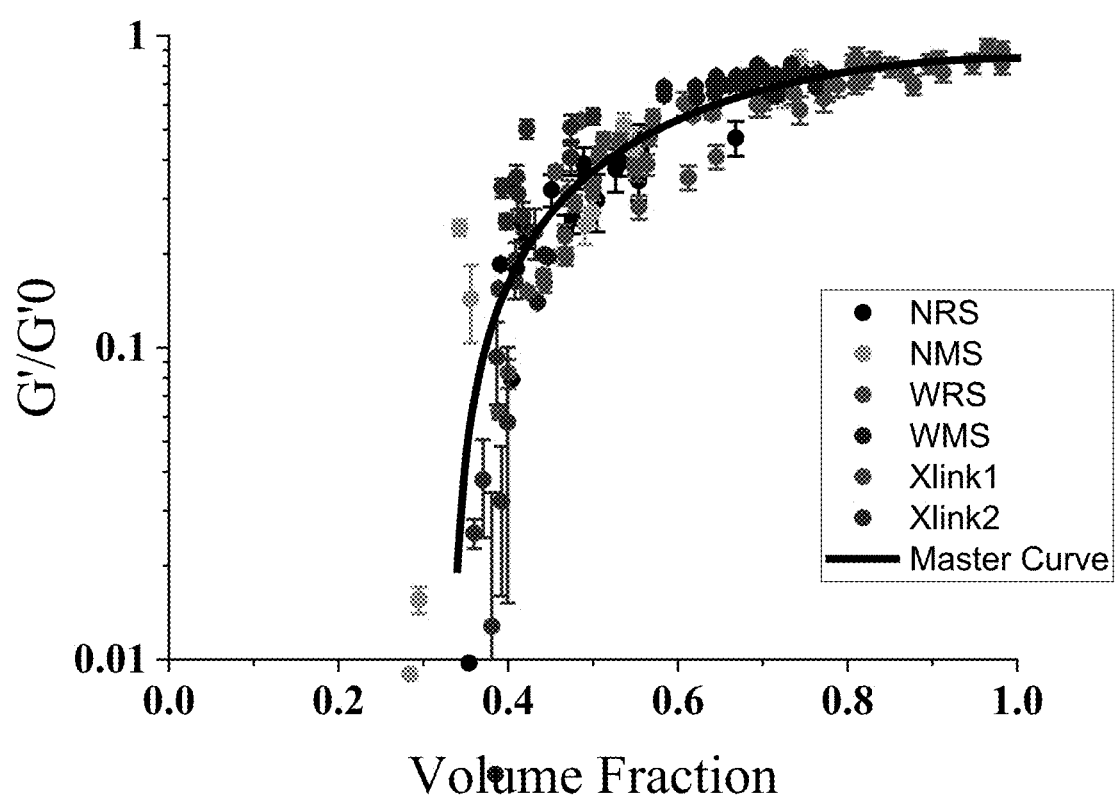
FIG. 27 Master curve as a plot of normalized storage modulus (G'/G$_0$') vs starch volume fraction obtained from experimental measurements for different starch varieties as shown in the figure.

The predicted volume fraction of the starch granules allows one to estimate the storage modulus of the starch by using the empirical master curve in FIG. 18 along with the limiting value of $G_0'$ (Table 4). FIG. 20 shows the comparison of the predicted value of G' vs. time from this procedure to experimental data for different starch varieties at holding temperatures of 80° C. As can be seen, the predicted G' vs time agrees well with experiments. Similar comparisons at other temperatures give similar results (data not shown). The ability of this methodology to predict the evolution of storage modulus for different types of starch pastes is demonstrated by the parity plot of predicted vs experimental storage modulus of starch paste for different starch types heated to different temperatures and holding times in FIG. 21. In order to further validate the methodology, 8% wt/wt suspension of NRS was subjected to three different heating profiles that are shown in FIG. 22 a-c inset. In the first, the sample was heated to 70° C. and held for 10 min and subsequently heated to 80° C. for 20 min. In the second, the sample was heated to 70° C. and held for 20 min and subsequently heated to 80° C. for 10 min. In the third, the sample was heated to 75° C. and held for 10 min and subsequently heated to 80° C. for 20 min. Samples that were collected at different times were subjected to particle size as well as linear viscoelasticity measurements. Volume fraction of starch suspensions were then calculated from experimental measurements. They were also predicted using the swelling model as described above. G' was then estimated from the predicted $\phi$ using the master curve. Experimental values of G' vs $\phi$ as shown in FIG. 22 a-c compare very well with the predicted values for the three heating profiles. Comparison of model predictions with experimental data for swelling power of three different starches at different temperatures are shown in FIG. 23.

Discussion

The rheological measurements shown herein are consistent with published observations for a wide range of starch varieties. Starch pasting is significant only above a gelatinization temperature, at which point starch granules swell considerably (Evans and Haisman 1980, Tan, Torley et al. 2008) (Tsai, Li et al. 1997). During swelling when the volume fraction of the starch is 0.4<$\phi$<0.65, the linear response of the suspension is primarily elastic in nature—i.e., the storage modulus (G') dominates the loss modulus (G"), and is independent of strain as long as the strain is sufficiently small ($\in$<<1). In this regime, the storage modulus increases precipitously as the volume fraction increases. Similar observations for linear viscoelasticity are reported for suspensions of solid spheres (glass) at below the colloidal glass transition (i.e., jamming) (Frith, Mewis et al. 1987, Mason and Weitz 1995). For glass spheres, the loss modulus (G") also exhibits a minimum with frequency, just like in our experiments using different starch varieties. These observations seem to suggest that one can describe starch rheology in this volume fraction regime using the ideas of rigid spheres near the colloidal glass transition.

For colloidal glasses, the storage modulus decreases precipitously with strain at high strain, while G" is relatively insensitive to strain. Thus, above a critical strain, the material yields. Interestingly, it appears that the yield stress collapses when plotted against volume fraction for a wide variety of heating times and heating temperatures.

Beyond the closed-packed limit ($\phi$=0.65), the storage modulus of the starch granules changes more moderate changes with volume fraction, and can qualitatively change depending on the composition of the granule. For rigid granules with high amylopectin content such as waxy maize and waxy rice granules, the suspension elasticity continues to increase beyond the close-packed volume fraction, albeit slightly. Such a behavior can be explained by a moderate deformability of close-packed granules upon further expansion, which allows the suspension to pack more efficiently and create a moderate increase in stress. For granules with lower amylopectin content like normal maize and normal rice, the starches exhibit a maximum elasticity at an intermediate volume fraction, followed by a decrease in elasticity. This may arise because the granules become soft and highly deformable, which causes the stress to decrease. Granule deformability depends on the type of starch and the strength of interactions among and between amylopectin and amylose. Higher deformability of these starches compared to waxy starches is demonstrated by lower values of peak force for deformation. Swelling of starch granules is precursor to the development of its texture (viscoelasticity). Therefore, starch swelling and pasting display the same functional dependence on holding temperature and time as well as on starch concentration.

In the limit under which the granules are not very deformable, one can develop a theory to estimate the limiting (i.e., maximum) storage modulus $G_0'$ of the starch suspension. The essential idea behind this theory is that granules are likely to adopt a foam-like structure in the limit of sufficiently high volume fraction. In an idealized foam structure consisting of particles of the same size, the granules are deformed in the shape of dodecahedron separated by thin film of aqueous phase. The modulus of elasticity of foam structure will depend on the interfacial energy of starch granules and equilibrium size of the granules. The interfacial energy depends on the type of starch (its amylose-amylopectin content), and the equilibrium granule size will depend on the initial granule size distribution of starch type and heating profile. Because of the above factors, different starch types and processing conditions are expected to exhibit different limiting values of $G_0'$ as is evident from Table 4.

Once an estimate of the limiting value of the storage modulus is made, one can estimate the storage modulus as a function of time for a given starch suspension during its initial stages of swelling. This involves two steps: (1) predicting the time dependent volume fraction of the granule suspension using the model for swelling kinetics described herein and in (Desam, Li et al. 2018a), and (2) using the empirical relationship between the normalized storage modulus $G'/G_0'$ vs. volume fraction that is described herein (i.e. master curve, FIG. 20), where one estimates the limiting storage modulus $G_0'$ from the interfacial energy and equilibrium granule size. The predicted storage modulus from the current analysis compares well with the time dependent, storage modulus for a wide range of starches (FIG. 21, parity plot). This could be useful for a wide variety of food industries attempting to design pasting of starches for various applications.

Regarding the interfacial free energies of granules measured in order to predict the limiting storage modulus G0', note the following. The interfacial free energies of NRS, WRS, NMS, WMS, 0.1% crosslinked NMS, and 0.2% crosslinked NMS are 6.98 mN/m, 4.36 mN/m, 14.6 mN/m, 11.31 mN/m, 7.25 mN/m, 8.32 mN/m respectively. These values are much smaller than corresponding interfacial tension values for organic solvent, such as hexane and octane against water (of the order of 50 mN/m) (Prince 1967). The surface tension of water at 20° C. is 72.62 mN/m (Vargaftik, Volkov et al. 1983). This seems to suggest that the granule surface is more compatible with water. The decrease in surface free energy for maize starch to that for rice starch may imply that the higher G' is associated with higher hydrophilicity of granule surface. The decrease in surface free energy for cross-linked maize compared to that for normal maize may imply that crosslinking makes the granule surface more hydrophilic. This is believed to be the result of higher surface charges as evidenced by our earlier reported results of zeta potential (Desam, Li et al. 2018b).

Conclusions

The storage modulus G' and loss modulus G" of starch paste were measured during heating of suspensions of starch granules of different types (WMS, NMS, WRS, and NRS) to different temperatures and holding times. G" is found to be much smaller than G' thereby indicating that the starch paste is elastic. In the linear viscoelastic region of strain, G' is insensitive to strain. G' increased with frequency and volume fraction of starch granules (heating temperature and time). The increase in G' with volume fraction of starch granules in the paste is monotonic for waxy starches whereas G' reached a maximum at volume fractions near close packed fraction and decreased at higher volume fractions because of deformability of granules as evidenced by peak force measurements. The experimental data of G' vs $\phi$ seem to fall into a master curve if one discounts data for normal starch types which exhibit excessive deformability and possible granule breakup. Yield stress for starch paste was found to be larger for higher temperature and larger holding times and for waxy starches. A previously developed mechanistic model was employed to predict the evolution of granule size distribution and granule volume fraction due to swelling for different starch types. The inferred starch volume fraction was then employed in the master curve to predict the evolution of G' for different holding temperatures for all starch samples and for different heating profiles for NRS which compared favorably with experimental data.

Section III

Example Prediction of Texture Development for Soup Formulation:

Soup was prepared by dissolving 7.5% (w/w) Normal Rice Starch (NRS, Penpure30 Lot #01110314), 4% (w/w) Crisco vegetable oil, 1.5% (w/w) Great Value heavy whipping cream, 1.2% (w/w) Isopure whey protein, 0.6% (w/w) NaCl in water.

Heating Profile:

The product was first heated from 25° C. to 45° C. and was equilibrated at this temperature for 1 min. The product was then heated to 70° C. and held at this temperature for 10 minutes. A sample was then collected after cooling it to 40° C. at 15° C./min and holding at this temperature for 5 minutes. Other samples were collected after heating to 80° C. and holding at that temperature for different times.

Figure 28:
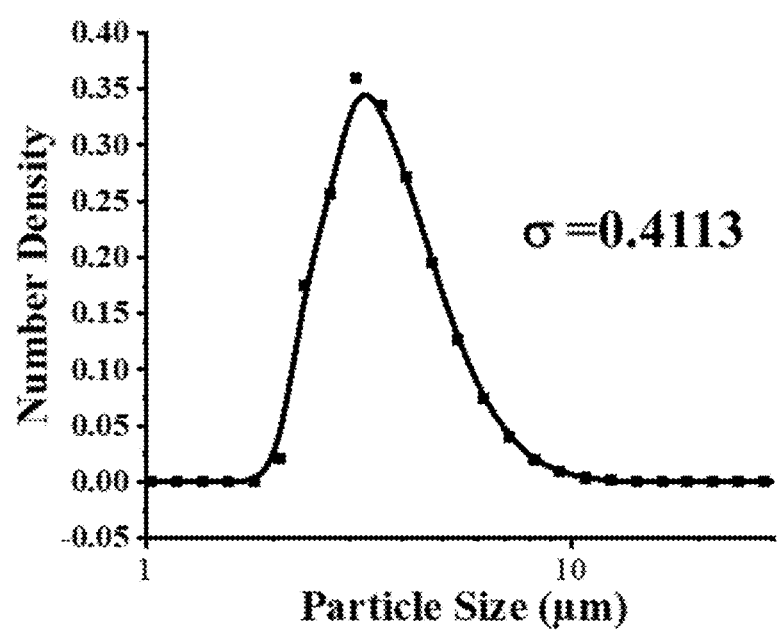
FIG. 28 Number density of dry normal rice starch powder at room temperature and fit to log normal distribution FIG. 29 Berry plot of normal rice starch solution at room temperature FIG. 30 DSC thermogram of normal rice starch. and values are given in the inset.

Parameters to Characterize the Starch Suspension for Use in the Model for Swelling:

1. Measure the particle size distribution of dry starch powder at room temperature. Obtain the number density vs particle size. Fit this to log normal distribution to obtain the standard deviation $\sigma^2$. The fit for initial distribution is shown in FIG. 28.

2. Calculate $\gamma$ and $\delta$ from $$\gamma = (e^{\sigma^2} + 2)\sqrt{e^{\sigma^2} - 1} \quad (1)$$

$$\delta = \sqrt{e^{\sigma^2} - 1} \quad (2)$$

Calculate the random close packed volume fraction of the granules $\phi_{cp}$ using $$\phi_{cp} = 0.634 + 0.06586 + 0.0857\gamma\delta^2 \quad (3)$$

3. Measure the bulk density $\rho_{bulk}$ of the granules by filling a known weight in a tube and tapping the tube to obtain a randomly close packed arrangement of particles and measuring the volume.

4. Calculate the void fraction E of the granule using $$\varepsilon = 1 - \frac{\rho_{bulk}}{\phi_{cp}\rho_{starch}} \quad (4)$$

where $\rho_{starch}$=1500 kg/m$^3$.

5. Calculate the density of granule $\rho_{granule}$ from $$\rho_{granule} = \varepsilon\rho_{water} + (1-\varepsilon)\rho_{starch} \quad (5)$$

where $\rho_{water}$ is density of water.

6. Calculate the initial volume fraction of normal rice starch $\phi_0$ in the soup using $$\phi_0 = \frac{w\rho}{\rho_{granule}} \quad (6)$$

In the above equation, w, the weight fraction of starch in the current formulation is 0.075 and ρ, the density of starch suspension is given by $$\rho = \frac{1}{\frac{1-w}{\rho_{water}} + \frac{w}{\rho_{starch}}} \quad (7)$$

7. Obtain the second virial coefficient A$_2$ of normal rice starch from static light scattering using the procedure outlined below. Sample will be prepared by dissolving a gram of normal rice starch in 20 ml of 95% DMSO, with magnetic stirring for 3 days at room temperature. The sample will then be precipitated with ethanol (60 mL) and stored overnight at 4° C. The precipitate will be filtered, washed successively with acetone (10 ml), air-dried under a hood for a few hours to eliminate solvents, and finally dried in an oven at 60° C. for 24 hours. The dried sample will then be dissolved in water to make a dilute solution.

Figure 29:
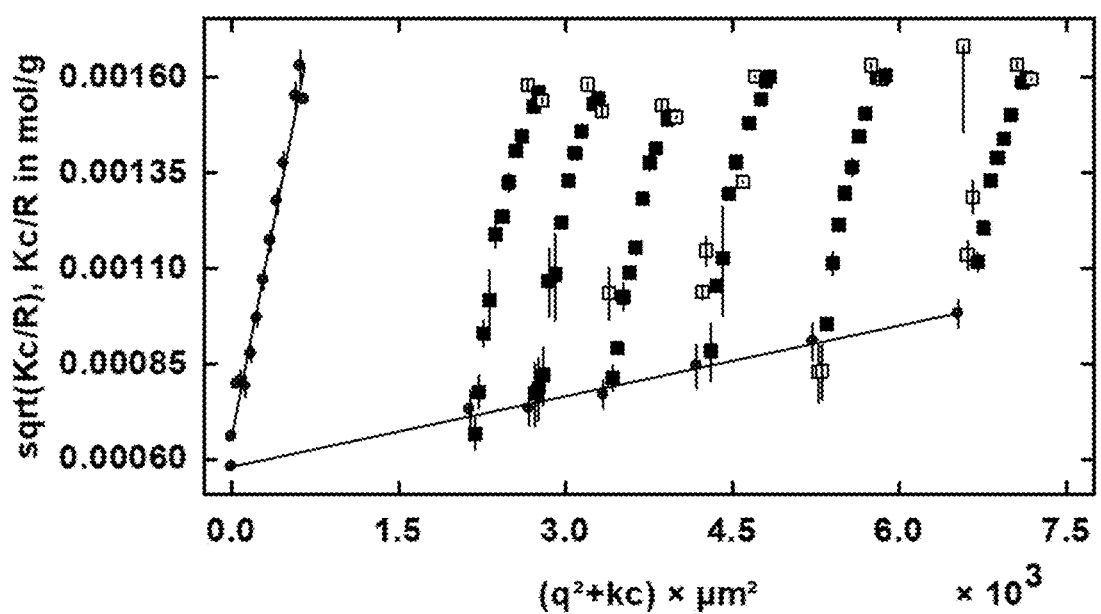

The light scattering experiments will be conducted at 25° C. from 30-150° in 10 degree increment. The sample will be diluted by 10% each time with water to reduce starch concentration. The Berry Plot will then be generated. The refractive index (dn/dc) can be taken at 0.146 mL/g. Berry plot for normal rice starch is shown in FIG. 29.

Figure 30:
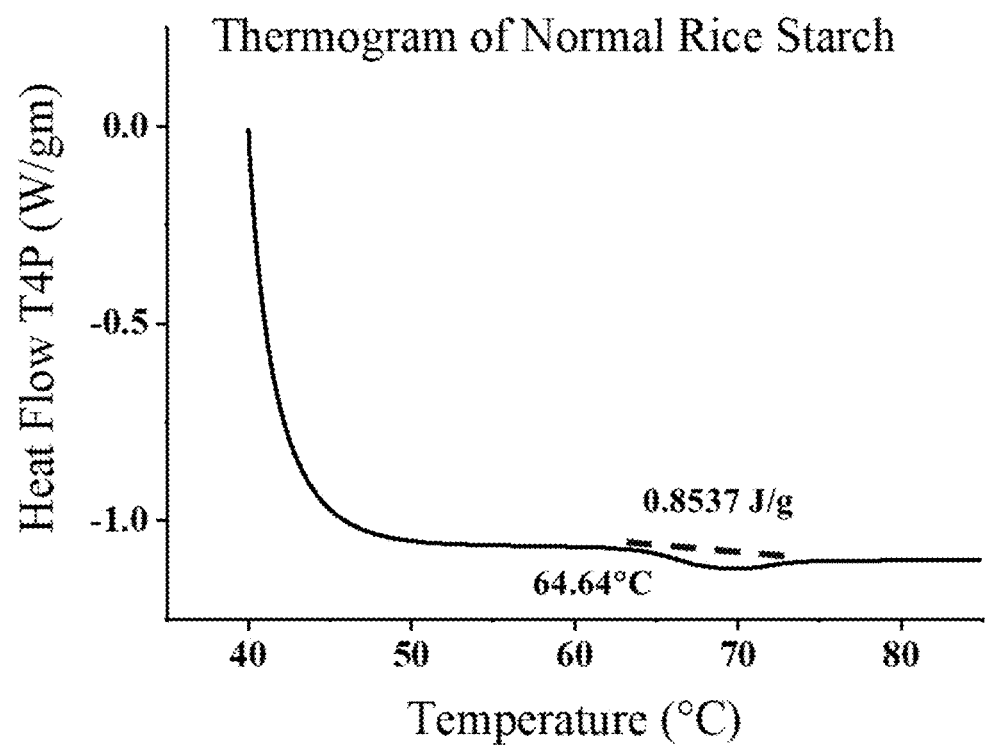

The second virial coefficient A$_2$ is inferred from Berry plot. The normal rice starch-water interaction parameter χ at room temperature is given by, $$\left(\frac{1}{2} - \chi\right) = A_2 \frac{\overline{v}_1}{\overline{v}_2^2} \quad (8)$$

where $\overline{v}_1$, the molar volume of solvent, is 18 m$^3$/mol and $\overline{v}_2$, the partial specific volume of normal rice starch is 8. The gelatinization temperature T$_g$ and enthalpy of gelatinization ΔH are obtained from thermogram of 7.5% w/w normal rice starch suspension using differential scanning calorimeter (DSC). Typical thermogram and the inferred values of these parameters are shown in FIG. 30.

9. The normal rice starch-water interaction parameter χ(T) at temperature T is given by, $$\chi(T) = \chi(T_0) \text{ if } T \le T_g \quad (9)$$
$$\chi(T) = \chi(T_0) - \frac{\Delta H}{RT_g}\left(1 - \frac{T_g}{T}\right) \text{ if } T > T_g$$

where T$_0$ is the room temperature.

10. The extent of cross link v* is obtained from the average of v* (T) at different temperatures using $$v^*(T) = -\frac{\ln(1 - \phi_{eq}(T)) + \phi_{eq}(T) + \chi(T)\phi_{eq}(T)^2}{\left(\phi_{eq}(T)^{1/3} - \frac{\phi_{eq}(T)}{2}\right)} \quad (10)$$

Figure 31:
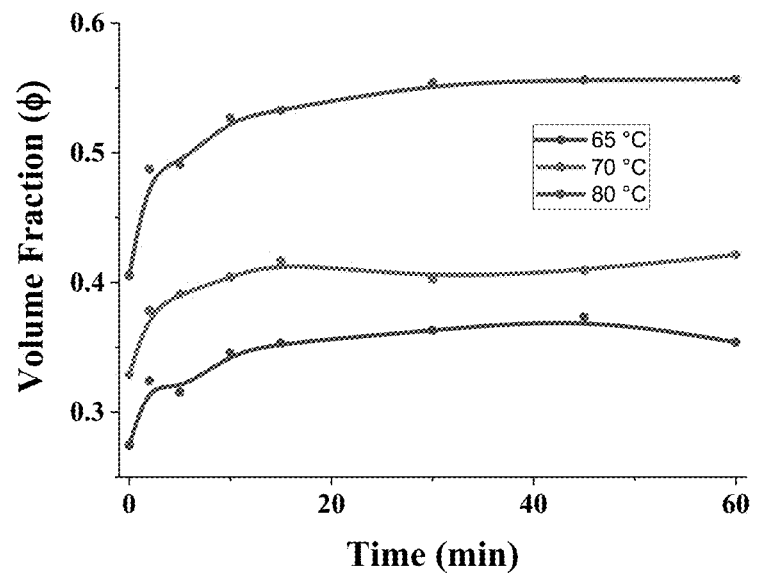
FIG. 31(a) vs time at different temperatures for 7.5% w/w suspension of normal rice starch (b) Inferred values of at different temperatures. The average value of is used for the prediction.
Figure 31:
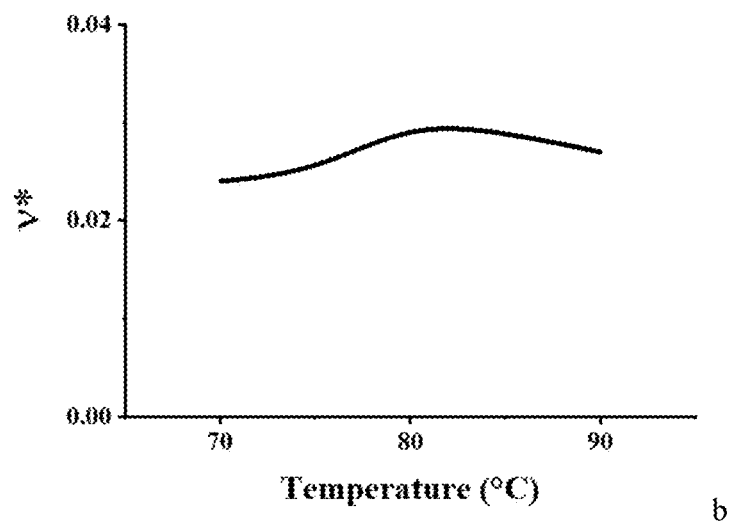

In the above equation, $\phi_{eq}$(T), the equilibrium volume fraction of starch inside the granule at temperature T, is $$\phi_0\left(\frac{\overline{v}_{eq}}{\overline{v}_0}\right),$$

where $\overline{v}_{eq}$ and $\overline{v}_0$, equilibrium and initial average granule volumes respectively, are obtained from the granule size distributions. Typical plots of φ vs time at different temperatures for 7.5% w/w suspension of normal rice starch is shown in FIG. 31.

TABLE 6, below shows the relevant parameters for different starch types. The parameter values for normal rice starch are employed in the procedure for texture prediction as outlined below.

| Type of Starch | T$_g$ (K) | Mw (g/mole) | ΔH (J/mol) | A$_2$ (mol m$^3$/kg$^2$) | χ | v* | b | G'$_0$ (Pa) |
|---|---|---|---|---|---|---|---|---|
| Waxy maize[1] | 334.1 | 2444500 | 238681 | 2.93E−06 | 0.5 | 0.004 | 2.5 | 687.048 |
| Normal maize[2] | 341.38 | 1950000 | 66885 | 2.50E−06 | 0.5 | 0.006 | 2.75 | 708.63 |
| Waxy rice[3] | 331.86 | 1609300 | 298425 | 2.41E−06 | 0.5 | 0.0388 | 5 | 585.58 |
| Normal rice[3] | 336.24 | 1516000 | 134521 | 2.30E−06 | 0.5 | 0.0298 | 4.5 | 632.256 |
| Xlink1 [2] (normal maize) | 342.1 | 2030000 | 109539 | 2.15E−06 | 0.5 | 0.02 | 5 | 659.468 |
| Xlink2[2] (normal maize) | 342.8 | 2350000 | 168893 | 2.07E−06 | 0.5 | 0.079 | 5.5 | 981.44 |

[1](Desain, Li et al. 2018a)
[2](Desam, Li et al. 2018b)
[3](Desam, Li et al. 2019)

Procedure for Prediction of Swelling:

A kinetic model of starch swelling is employed to predict the evolution of granule size distribution and therefore starch granule volume fraction for all starch samples at different holding temperatures and times. The details of the mechanistic model are given in our earlier publication (Desam, Li et al. 2018a). Briefly, the model expresses the diffusion of water into the granule arising from a chemical potential gradient. The chemical potential of water inside the granule is expressed in terms of the volume fraction of starch inside the granule via Flory-Huggins polymer solution thermodynamics. The parameters for normal rice starch as given in Table 1 can be employed in the model. The heating profile, i.e. temperature as a function of time, would appear in the time dependent boundary condition for the surface temperature of starch granule at different times. This swelling model, combined with a population balance analysis, allows one to predict the granule size distribution, and hence volume fraction, as a function of time. The predicted evolution of starch volume fraction for soup formulation for given heating profile (as shown in the inset) is shown in FIG. 32.

Figure 33:
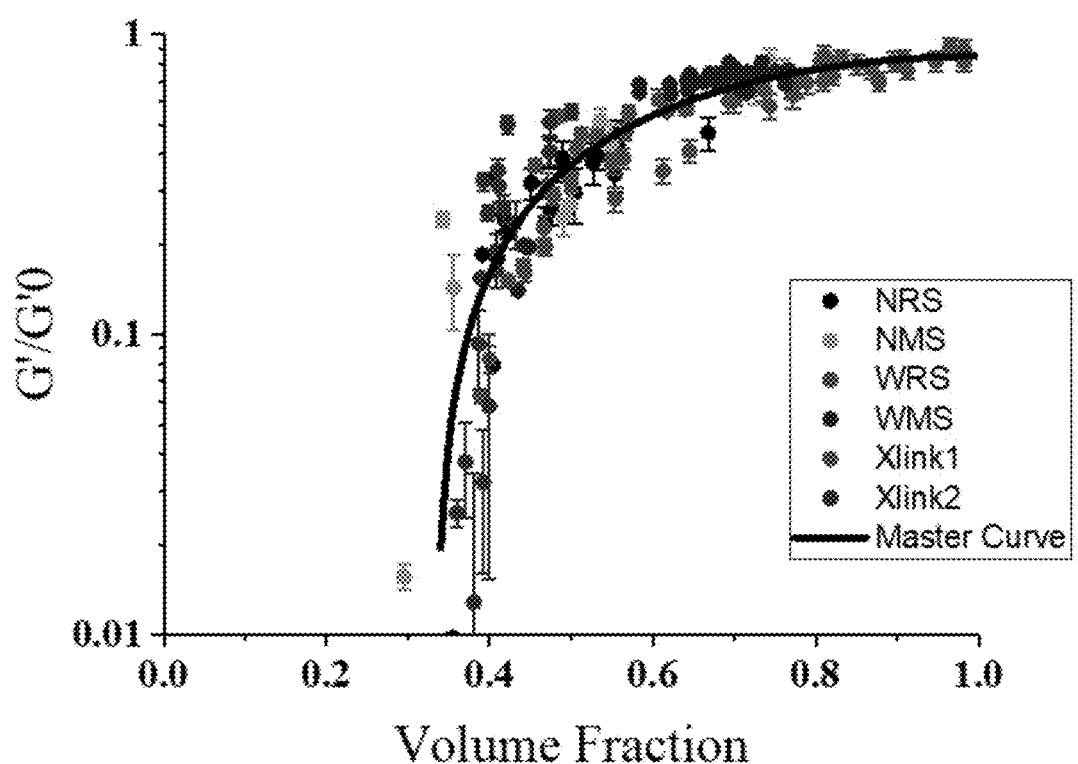
FIG. 33 Master curve for normalized storage modulus G'/G$_0$'vs $\phi$

Procedure for Prediction of Texture Development:

From experimental data for a variety of starch types, we developed a master curve as a plot of normalized storage modulus $G'/G_0'$ vs volume fraction of starch 0 as shown in FIG. 33. The normalizing storage modulus for different starch varieties are shown in Table 6.

Figure 32:
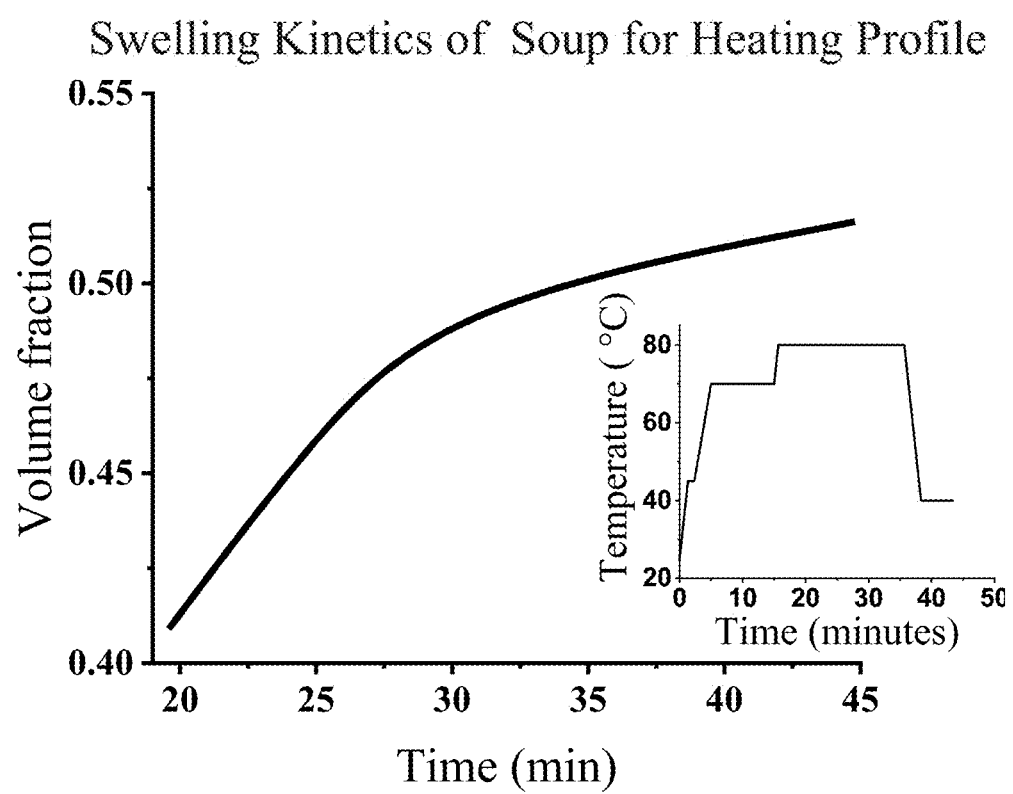
FIG. 32 Predicted volume fraction for soup formulation (7.5% w/w normal rice starch suspension) subjected to heating profile shown in the inset.
Figure 34:
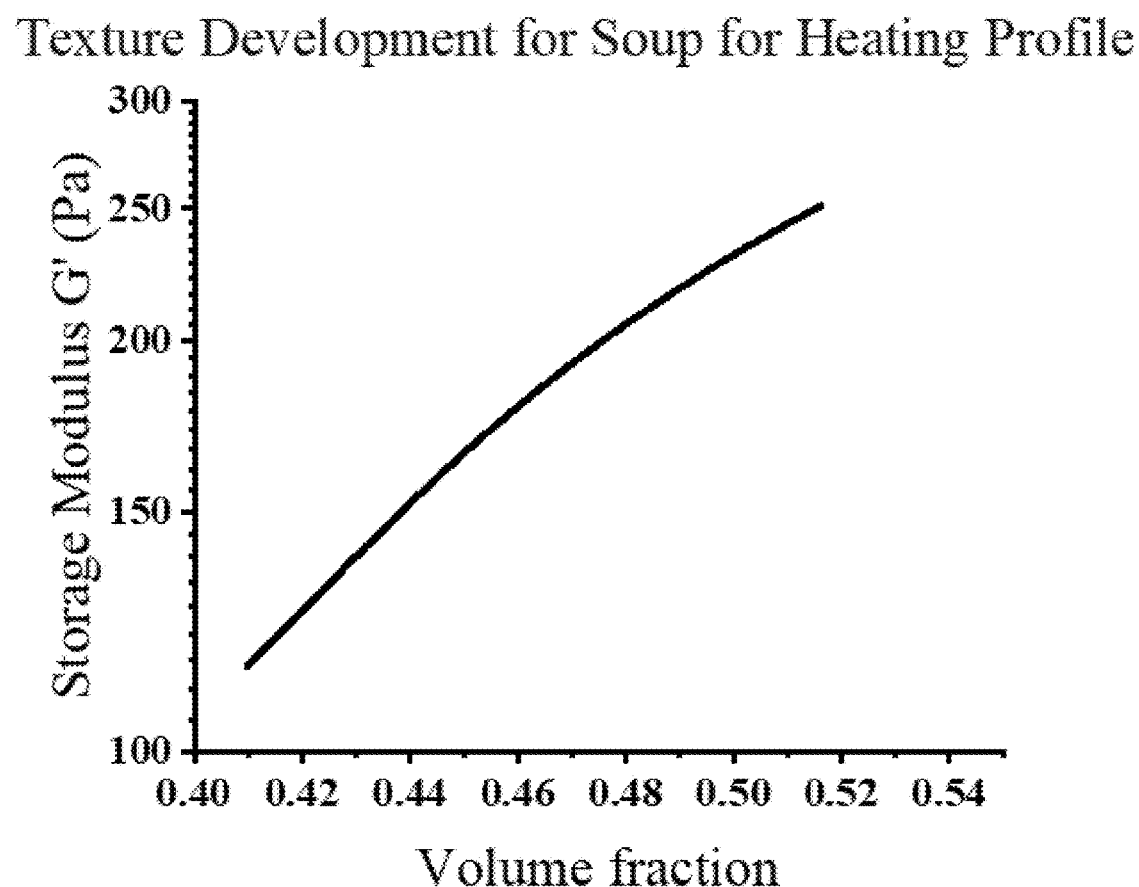
FIG. 34 Predicted texture development for soup formulation for the given heating profile.

The normalized storage modulus at different times were then inferred from the above master curve using the predicted volume fractions as shown in FIG. 32. From the knowledge of $G_0'$ from Table 6 for normal rice starch, G' is evaluated. The predicted evolution of G' for soup formulation for the above heating profile is shown in FIG. 34.

While certain embodiments of the present invention have been described and/or exemplified above, it is contemplated that considerable variation and modification thereof are possible. Accordingly, the present invention is not limited to the particular embodiments described and/or exemplified herein.

REFERENCES

Ai, Y. and J.-I. Jane (2015). "Gelatinization and rheological properties of starch." Starch-Stärke 67(3-4): 213-224.

Bagley, E. B. and D. D. Christianson (1982). "Swelling Capacity of Starch and Its Relationship to Suspension Viscosity—Effect of Cooking Time, Temperature and Concentration." Journal of Texture Studies 13(1): 115-126.

Baker, A., M. Miles and W. Helbert (2001). "Internal structure of the starch granule revealed by AFM." Carbohydrate Research 330(2): 249-256.

Baumgartner, S., J. Kristl and N. Peppas (2002). "Network structure of cellulose ethers used in pharmaceutical applications during swelling and at equilibrium." Pharmaceutical Research 19(8): 1084-1090.

Biliaderis, C. G. (1991). "The Structure and Interactions of Starch with Food Constituents." Canadian Journal of Physiology and Pharmacology 69(1): 60-78.

Delgado, J. (2006). "A simple experimental technique to measure tortuosity in packed beds." Canadian Journal of Chemical Engineering 84(6): 651-655.

Desam, G. P., J. Li, G. Chen, O. Campanella and G. Narsimhan (2019). "Swelling kinetics of rice and potato starch suspensions." Journal of Food Process Engineering n/a(n/a): e13353.

Desam, G. P., J. S. Li, G. B. Chen, O. Campanella and G. Narsimhan (2018a). "A mechanistic model for swelling kinetics of waxy maize starch suspension." Journal of Food Engineering 222: 237-249.

Desam, G. P., J. S. Li, G. B. Chen, O. Campanella and G. Narsimhan (2018b). "Prediction of swelling behavior of crosslinked maize starch suspensions." Carbohydrate Polymers 199: 331-340.

Desmond, K. W. and E. R. Weeks (2014). "Influence of particle size distribution on random close packing of spheres." Physical Review E 90(2): 022204.

Doublier, J. L. (1981). "Rheological Studies on Starch—Flow Behavior of Wheat-Starch Pastes." Starke 33(12): 415-420.

Ellis, H. S., S. G. Ring and M. A. Whittam (1989). "A comparison of the viscous behavior of wheat and maize starch pastes." Journal of Cereal Science 10 33-44.

Evans, I. D. and D. R. Haisman (1980). "Rheology of gelatinized starch suspensions" Journal of Texture Studies 10(4): 347-370.

Evans, I. D. and A. Lips (1992). "Viscoelasticity of Gelatinized Starch Dispersions." Journal of Texture Studies 23(1): 69-86.

Flory, P. J. (1953). Principles of Polymer Chemistry, Cornell University Press: Ithaca, N.Y.

Frith, W. J., J. Mewis and T. A. Strivens (1987). "Rheology of concentrated suspensions: experimental investigations." Powder Technology 51(1): 27-34.

Hirotsu, S., Y. Hirokawa and T. Tanaka (1987). "Volume-phase transitions of ionized N-isopropylacrylamide gels." J. Chem. Phys. 87(2): 1392-1395.

Hooper, H. H., J. P. Baker, H. W. Blanch and J. M. Prausnitz (1990). "Swelling equilibria for positively charged polyacrylamide hydrogels." Macromolecules 23(4): 1096-1104.

Hoover, R. (2001). "Composition, molecular structure, and physicochemical properties of tuber and root starches: a review." Carbohydrate Polymers 45(3): 253-267.

Hoover, R. and D. Hadziyev (1981). "Characterization of Potato Starch and Its Monoglyceride Complexes." Starke 33(9): 290-300.

Huang, J. R., H. A. Schols, J. J. G. van Soest, Z. Y. Jin, E. Sulmann and A. G. J. Voragen (2007). "Physicochemical properties and amylopectin chain profiles of cowpea, chickpea and yellow pea starches." Food Chemistry 101 (4): 1338-1345.

Jackson, P. D., D. Taylorsmith and P. N. Stanford (1978). "Resistivity-porosity-particle shape relationships for marine sands." Geophysics 43(6): 1250-1268.

Jobling, S. (2004). "Improving starch for food and industrial applications." Current Opinion in Plant Biology 7(2): 210-218.

Johnson, K. L., K. Kendall and A. D. Roberts (1971). "Surface energy and the contact of elastic solids." Proceedings Royal Society of London A 324: 301-313.

Keetels, C. J. A. M. and T. Van Vliet (1994). Gelation and retrogradation of concentrated starch gels. Gums and Stabilizers for the Food Industry. G. O. Pillips, P. A. Williams and D. J. Wedlock. New York, IRL.

Kim, B., K. La Flamme and N. A. Peppas (2003). "Dynamic swelling Behavior of pH-sensitive anionic hydrogels used for protein delivery." Journal of Applied Polymer Science 89(6): 1606-1613.

Kruger, A., C. Ferrero and N. E. Zaritzky (2003). "Modelling corn starch swelling in batch systems: effect of sucrose and hydrocolloids." Journal of Food Engineering 58(2): 125-133.

Lagarrigue, S., G. Alvarez, G. Cuvelier and D. Flick (2008). "Swelling kinetics of waxy maize and maize starches at high temperatures and heating rates." Carbohydrate Polymers 73(1): 148-155.

Lan, H., R. Hoover, L. Jayakody, Q. Liu, E. Donner, M. Baga, E. K. Asare, P. Hucl and R. N. Chibbar (2008). "Impact of annealing on the molecular structure and physicochemical properties of normal, waxy and high amylose bread wheat starches." Food Chemistry 111(3): 663-675.

Mason, T. G. and D. A. Weitz (1995). "Linear Viscoelasticity of Colloidal Hard Sphere Suspensions near the Glass Transition." Physical Review Letters 75(14): 2770-2773.

Matyka, M., A. Khalili and Z. Koza (2008). "Tortuosity-porosity relation in porous media flow." Physical Review E 78(2).

Mishra, S. and T. Rai (2006). "Morphology and functional properties of corn, potato and tapioca starches." Food Hydrocolloids 20(5): 557-566.

Narsimhan, G. and E. Ruckenstein (1986a). "Hydrodynamics, Enrichment, and Collapse in Foams." Langmuir 2(2): 230-238.

Navickis, L. L. and E. B. Bagley (1983). "Yield Stresses in Concentrated Dispersions of Closely Packed, Deformable Gel Particles." Journal of Rheology 27(6): 519-536.

Obanni, M. and J. N. Bemiller (1997). "Properties of some starch blends." Cereal Chemistry 74(4): 431-436.

Ofner, C. and W. Bubnis (1996). "Chemical and swelling evaluations of amino group crosslinking in gelatin and modified gelatin matrices." Pharmaceutical Research 13(12): 1821-1827.

Okechukwu, P. E. and M. A. Rao (1995). "Influence of granule size on viscosity of cornstarch suspension." Journal of Texture Studies 26(5): 501-516.

Okechukwu, P. E. and M. A. Rao (1996). "Role of granule size and size distribution in the viscosity of cowpea starch dispersions heated in excess water." Journal of Texture Studies 27(2): 159-173.

Owens, D. K. and R. C. Wendt (1969). "Estimation of Surface Free Energy of Polymers." Journal of Applied Polymer Science 13(8): 1741-&.

Prince, L. M. (1967). "A theory of aqueous emulsions I. Negative interfacial tension at the oil/water interface." Journal of Colloid And Interface Science 23(2): 165-173.

Ricka, J. and T. Tanaka (1985). "Phase transition in ionic gels induced by copper complexation." Macromolecules 18(1): 83-85.

Shen, L. and Z. Chen (2007). "Critical review of the impact of tortuosity on diffusion." Chemical Engineering Science 62(14): 3748-3755.

Singh, J., A. Dartois and L. Kaur (2010). "Starch digestibility in food matrix: a review." Trends in Food Science & Technology 21(4): 168-180.

Singh, J., L. Kaur and O. J. McCarthy (2007). "Factors influencing the physico-chemical, morphological, thermal and rheological properties of some chemically modified starches for food applications—A review." Food Hydrocolloids 21(1): 1-22.

Singh, J. and N. Singh (2001). "Studies on the morphological, thermal and rheological properties of starch separated from some Indian potato cultivars." Food Chemistry 75(1): 67-77.

Singh, N. and L. Kaur (2004). "Morphological, thermal, rheological and retrogradation properties of potato starch fractions varying in granule size." Journal of the Science of Food and Agriculture 84(10): 1241-1252.

Singh, N., J. Singh, L. Kaur, N. S. Sodhi and B. S. Gill (2003). "Morphological, thermal and rheological properties of starches from different botanical sources." Food Chemistry 81(2): 219-231.

Stamenovic, D. (1991). "A Model of Foam Elasticity Based Upon the Laws of Plateau." Journal of Colloid and Interface Science 145(1): 255-259.

Tan, I., P. J. Torley and P. J. Halley (2008). "Combined rheological and optical investigation of maize, barley and wheat starch gelatinisation." Carbohydrate Polymers 72(2): 272-286.

Tanaka, T. (1978). "Collapse of gels and critical endpoint." Phys. Rev. Lett. 40(12): 820-823.

Tester, R. F. and W. R. Morrison (1990a). "Swelling and Gelatinization of Cereal Starches 1. Effects of Amylopectin, Amylose, and Lipids." Cereal Chemistry 67(6): 551-557.

Tester, R. F. and W. R. Morrison (1990a). "Swelling and gelatinization of cereal starches. I. Effects of amylopectin, amylose, and lipids." Cereal Chem 67: 551-557.

Tester, R. F. and W. R. Morrison (1990b). "Swelling and gelatinization of cereal starches. II. Waxy rice starches." Cereal Chem 67(6): 558-563.

Thorat, I., D. Stephenson, N. Zacharias, K. Zaghib, J. Harb and D. Wheeler (2009). "Quantifying tortuosity in porous Li-ion battery materials." Journal of Power Sources 188(2): 592-600.

Tsai, M.-L., C.-F. Li and C.-Y. Lii (1997). "Effects of Granular Structures on the Pasting Behaviors of Starches." Cereal Chemistry 74(6): 750-757.

Vargaftik, N. B., B. N. Volkov and L. D. Voljak (1983). "International Tables of the Surface Tension of Water." Journal of Physical and Chemical Reference Data 12(3): 817-820.

Yadav, R. B., N. Kumar and B. S. Yadav (2016). "Characterization of banana, potato, and rice starch blends for their physicochemical and pasting properties." Cogent Food & Agriculture 2(1): 1127873.

Yeh, A. I. and S. L. Yeh (1993). "Some characteristics of hydroxypropylated and cross-linked rice starch." Cereal Chemistry 70(5): 596-601.

Zhang, J. and N. A. Peppas (2000). "Synthesis and characterization of pH- and temperature-sensitive poly(methacrylic acid)/poly(N-isopropylacrylamide) interpenetrating polymeric networks." Macromolecules 33(1): 102-107.

Zhang, S., X. Fan, L. Lin, L. Zhao, A. Liu and C. Wei (2016). "Properties of Starch from Root Tuber of *Stephania epigaea* in Comparison with Potato and Maize Starches." International Journal of Food Properties: 1-11.

What is claimed is:

1. A process for predicting the storage modulus (G') of an aqueous starch suspension after the starch suspension is heated as described by a heating profile using a master curve of normalized storage modulus ($G'/G_0'$) vs the volume fraction of the starch granules ($\phi$), wherein the starch suspension before heating comprises a first size distribution of starch granules, the process comprising the steps of, a) selecting the starch;

b) selecting the heating profile;

c) predicting the amount of swelling of the starch granules to yield a second size distribution of starch granules;

d) using the result of step c) for predicting the time dependent volume fraction of the starch granules (φ) of the starch suspension after heating;

e) using the master curve of normalized storage modulus ($G'/G_0'$) vs the volume fraction of the starch granules (φ) to determine the normalized storage modulus of the heated starch suspension, wherein $G_0'$ is the limiting value of storage modulus for volume fraction approaching unity, and f) using the value for $G_0'$ of the starch to determine G'.

2. The process of claim 1 wherein the starch is selected from the group consisting of a waxy maize starch, a normal maize starch, a waxy rice starch, a normal rice starch, and a cross-linked normal maize starch.

3. The process of claim 2 wherein the cross-linked normal maize starch is cross-linked with sodium trimetaphosphate.

4. The process of claim 1 wherein the heating profile consists of heating the starch suspension to a first temperature (Temp 1) between 60° C. and 90° C. and holding the suspension at the first temperature for Time1, where Time1 is 5 to 60 minutes; optionally followed by heating the starch suspension to a second temperature (Temp2) between 60° C. and 90° C., where Temp2 is greater than Temp1 and holding the starch suspension at the second temperature for Time2, where Time2 is 5 to 60 minutes.

5. The process of claim 4 where Time1+Time2 is 5 to 60 minutes.

6. The process of claim 4 wherein the first temperature is 60° C. and the second temperature is 65° C., 70° C., 75° C., 80° C., 85° C., or 90° C.

7. The process of claim 4 wherein the first temperature is selected from 60° C., 65° C., 70° C., 75° C., 80° C., 85° C., or 90° C. and the suspension is not heated to the second temperature.

8. The process of claim 4 wherein the starch is selected from the group consisting of a waxy maize starch, a normal maize starch, a waxy rice starch, a normal rice starch, and a cross-linked normal maize starch.

9. The process of claim 1 wherein the starch suspension is included in a food formulation.

10. The process of claim 1 wherein the heating profile consists of heating the starch suspension to a first temperature (Temp 1) between 60° C. and 90° C. and holding the suspension at the first temperature for Time1, where Time1 is 5 to 60 minutes; optionally followed by heating the starch suspension to a second temperature (Temp2) between 60° C. and 90° C., where Temp2 is greater than Temp1 and holding the starch suspension at the second temperature for Time2, where Time2 is 5 to 60 minutes.

11. The process of claim 10 where Time1+Time2 is 5 to 60 minutes.

12. The process of claim 11 wherein the first temperature is 60° C. and the second temperature is 65° C., 70° C., 75° C., 80° C., 85° C., or 90° C.

13. The process of claim 10 wherein the first temperature is selected from 60° C., 65° C., 70° C., 75° C., 80° C., 85° C., or 90° C. and the suspension is not heated to the second temperature.

14. The process of claim 10 wherein the starch is selected from the group consisting of a waxy maize starch, a normal maize starch, a waxy rice starch, a normal rice starch, and a cross-linked normal maize starch.

15. A process for selecting a heating profile for a suspension of a starch to yield a storage modulus (G') for the starch suspension in the range of 25 Pa to 600 Pa comprising the steps of:

a) selecting the starch;

b) selecting a heating profile;

c) using the process of claim 1 to yield a predicted storage modulus (G);

d) compare the predicted (G') to the range of 25 Pa to 600 Pa for the storage modulus (G'); and repeating steps b) and c) until the predicted (G') is in the range of 25 Pa to 600 Pa.

16. The process of claim 15 wherein the starch is selected from the group consisting of a waxy maize starch, a normal maize starch, a waxy rice starch, a normal rice starch, and a cross-linked normal maize starch.

17. The process of claim 16 wherein the cross-linked normal maize starch is cross-linked with sodium trimetaphosphate.

18. The process of claim 15 wherein the starch suspension is included in a food formulation.

19. The process of claim 15 wherein the storage modulus (G') for the starch suspension is in the range of 120 Pa to 250 Pa.

* * * * *